United States Patent
Reese et al.

(10) Patent No.: US 7,392,361 B2
(45) Date of Patent: Jun. 24, 2008

(54) GENERIC REALLOCATION FUNCTION FOR HEAP RECONSTITUTION IN A MULTI-PROCESSOR SHARED MEMORY ENVIRONMENT

(75) Inventors: David L. Reese, Westborough, MA (US); Steven R. Chalmer, Auburndale, MA (US); Steven T. McClure, Northboro, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 382 days.

(21) Appl. No.: 11/049,817

(22) Filed: Feb. 3, 2005

(65) Prior Publication Data
US 2005/0132162 A1    Jun. 16, 2005

Related U.S. Application Data

(63) Continuation-in-part of application No. 10/123,661, filed on Apr. 16, 2002, now Pat. No. 7,330,956.

(51) Int. Cl.
*G06F 12/00* (2006.01)
*G06F 13/00* (2006.01)
*G06F 13/28* (2006.01)
*G06F 9/00* (2006.01)
*G06F 9/24* (2006.01)
*G06F 15/177* (2006.01)
*G06F 1/24* (2006.01)

(52) U.S. Cl. .................. 711/170; 711/166; 711/173; 713/1; 713/2; 713/100

(58) Field of Classification Search .................. 711/170
See application file for complete search history.

(56) References Cited

U.S. PATENT DOCUMENTS

| 5,625,819 | A  * | 4/1997  | Hoffer, Jr. .................. 707/202 |
| 5,913,215 | A  * | 6/1999  | Rubinstein et al. ............ 707/10 |
| 2004/0215911 | A1 * | 10/2004 | Ouren et al. ................ 711/170 |
| 2004/0250041 | A1 * | 12/2004 | Sollich ...................... 711/170 |
| 2004/0268076 | A1 * | 12/2004 | Chauvel et al. ............. 711/170 |
| 2005/0138320 | A1 * | 6/2005  | Mitarai et al. ............... 711/170 |

* cited by examiner

*Primary Examiner*—Kevin Ellis
*Assistant Examiner*—Ryan Bertram
(74) *Attorney, Agent, or Firm*—Muirhead and Saturnelli, LLC

(57) ABSTRACT

Managing memory includes receiving a request for a memory allocation, determining whether the memory allocation is to be maintained when subsequently initializing memory and saving information about the memory allocation to maintain the memory allocation during subsequently initializing memory. Initializing may be performed as part of special reset mode processing. Special reset mode processing may be performed in response to receiving a reset command. The memory may be shared by a plurality of processing units and the reset command may be issued to reset a first processing unit causing reset of the memory and a second processing unit may use a first allocated memory portion that is maintained when initializing the memory as part of processing for the reset command. Saving may include adding an entry to an allocation list associated with the memory, the entry including a location associated with the memory allocation.

20 Claims, 21 Drawing Sheets

GENERIC REALLOCATION FUNCTION FOR HEAP RECONSTITUTION IN A MULTI-PROCESSOR SHARED MEMORY ENVIRONMENT

CROSS REFERENCE TO RELATED APPLICATIONS

This application is a continuation-in-part of U.S. patent application Ser. No. 10/123,661, filed Apr. 16, 2002 now U.S. Pat. No. 7,330,956 entitled, "BUCKET BASED MEMORY ALLOCATION", which is incorporated herein by reference.

BACKGROUND OF THE INVENTION

1. Technical Field

This application relates to the field of memory management, and more particularly to the field of managing dynamically allocated computer memory.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may nor correspond to the actual disk drives.

The host adapters, disk adapters, and other internal components of the storage device (such as RDF adapters, RA's) may each have their own local processor and operating system. Each request to an internal component of the storage device may be scheduled as a task that is serviced by the operating system of the internal component. In some cases, a task may temporarily need a block of memory for its processing. In those cases, it may be useful for the operating system to be able to dynamically obtain and release blocks of memory for temporary usage by the tasks. Conventionally, the available, unused, memory is maintained in a heap, and an operating system services memory requests by returning a portion of the heap memory to the requesting task. Once the requesting task has used the memory, the task calls a routine to return the memory to the heap.

In some cases, the memory may be shared among multiple processing units. When one of the processing units performs a reset, part of the reset processing includes restoring previously allocated memory to the heap for reallocation. In other words, if a first processing unit performs a reset while a second processing unit is currently using allocated memory portions from the heap, the operations of the second processing unit using the allocated memory portions are interrupted. The allocated memory portions are restored to the heap for reallocation.

It may be desirable to have a special reset mode which preserves the contents of selective portions of allocated memory used so that when a special reset is performed, the contents of the selective portions are preserved.

SUMMARY OF THE INVENTION

According to the present invention, managing memory includes receiving a request for a memory allocation, determining whether the memory allocation is to be maintained when subsequently initializing memory and saving information about the memory allocation to maintain the memory allocation during subsequently initializing memory. Initializing may be performed as part of special reset mode processing. Special reset mode processing may be performed in response to receiving a reset command. The memory may be shared by a plurality of processing units and the reset command may be issued to reset a first processing unit causing reset of the memory and a second processing unit may use a first allocated memory portion that is maintained when initializing the memory as part of processing for the reset command. Saving may include adding an entry to an allocation list associated with the memory, the entry including a location associated with the memory allocation. Managing memory may also include returning the memory allocation to a portion of available memory designated as available for use in subsequent allocations and removing an entry from the allocation list in response to returning if the memory allocation has a corresponding entry on the allocation list. The memory allocation may be returned to a table of unused memory blocks organized in accordance with a size associated with each of the unused memory blocks, the memory allocation may be returned to a location in the table in accordance with a size of the memory allocation. The memory allocation may be selected from a table of unused memory blocks organized in accordance with a size associated with each of the unused memory blocks. Managing memory may also include, in response to there being no block of memory in the table in accordance with a requested amount of memory, requesting a block of memory from a heap. Managing memory may also include, in response to there being no block of memory in the heap corresponding to the request, returning all unused blocks of memory from the table to the heap. Allocating memory may include setting a marker value in a field associated with the memory allocation indicating that the memory allocation is to be maintained during a subsequent initialization. Managing memory may also include setting the field to a non-marker value and returning the memory allocation to a portion of available memory designated as available for use in subsequent allocations. Managing memory may also include returning the memory allocation to a portion of available memory designated as available for use in subsequent allocations, wherein the field is used to connect a block of memory corresponding to the memory allocation to another portion of available memory.

According further to the present invention, managing memory includes performing a subsequent initialization, while performing the subsequent initialization, determining special portions of memory previously marked to be maintained during the subsequent initialization, allocating the special portions after initiating the subsequent initialization and prior to receiving any requests for memory, and, following allocating the special portions, allowing allocation of additional portions in response to a request for memory, where the additional portions do not overlap with the special portions. The special portions may be created in response to requests for memory prior to performing the special initialization.

According further to the present invention, computer executable code, embodied in a computer readable medium, that manages memory, includes executable code that receives a request for a memory allocation, executable code that determines whether the memory allocation is to be maintained when subsequently initializing memory, and executable code that saves information about the memory allocation to maintain the memory allocation during subsequently initializing memory. Initializing may be performed as part of special reset mode processing. Special reset mode processing may be performed in response to receiving a reset command. The memory may be shared by a plurality of processing units and the reset command may be issued to reset a first processing unit causing reset of the memory and a second processing unit may use a first allocated memory portion that is maintained when initializing the memory as part of processing for the reset command. Executable code that saves may include executable code that adds an entry to an allocation list associated with the memory, the entry including a location associated with the memory allocation. The computer executable code may also include executable code that returns the memory allocation to a portion of available memory designated as available for use in subsequent allocations and executable code that removes an entry from the allocation list in response to returning if the memory allocation has a corresponding entry on the allocation list. The memory allocation may be returned to a table of unused memory blocks organized in accordance with a size associated with each of the unused memory blocks, the memory allocation being returned to a location in the table in accordance with a size of the memory allocation. The memory allocation may be selected from a table of unused memory blocks organized in accordance with a size associated with each of the unused memory blocks. The computer executable code may also include executable code that requests a block of memory from a heap in response to there being no block of memory in the table in accordance with a requested amount of memory. The computer executable code may also include executable code that returns all unused blocks of memory from the table to the heap in response to there being no block of memory in the heap corresponding to the request. Executable code that allocates memory may include executable code that sets a marker value in a field associated with the memory allocation indicating that the memory allocation is to be maintained during a subsequent initialization. The computer executable code may also include executable code that sets the field to a non-marker value and executable code that returns the memory allocation to a portion of available memory designated as available for use in subsequent allocations. The computer executable code may also include executable code that returns the memory allocation to a portion of available memory designated as available for use in subsequent allocations, wherein the field is used to connect a block of memory corresponding to the memory allocation to another portion of available memory.

According further to the present invention, computer executable code, embodied in a computer readable medium, that manages memory includes executable code that performs a subsequent initialization, executable code that determines special portions of memory previously marked to be maintained during he subsequent initialization while performing the subsequent initialization, executable code that allocates the special portions after initiating the subsequent initialization and prior to receiving any requests for memory, and executable code that allows allocation of additional portions in response to a request for memory, wherein the additional portions do not overlap with the special portions following allocating the special portions. The special portions may be created in response to requests for memory prior to performing the special initialization.

DETAILED DESCRIPTION OF VARIOUS EMBODIMENTS

Figure 1:
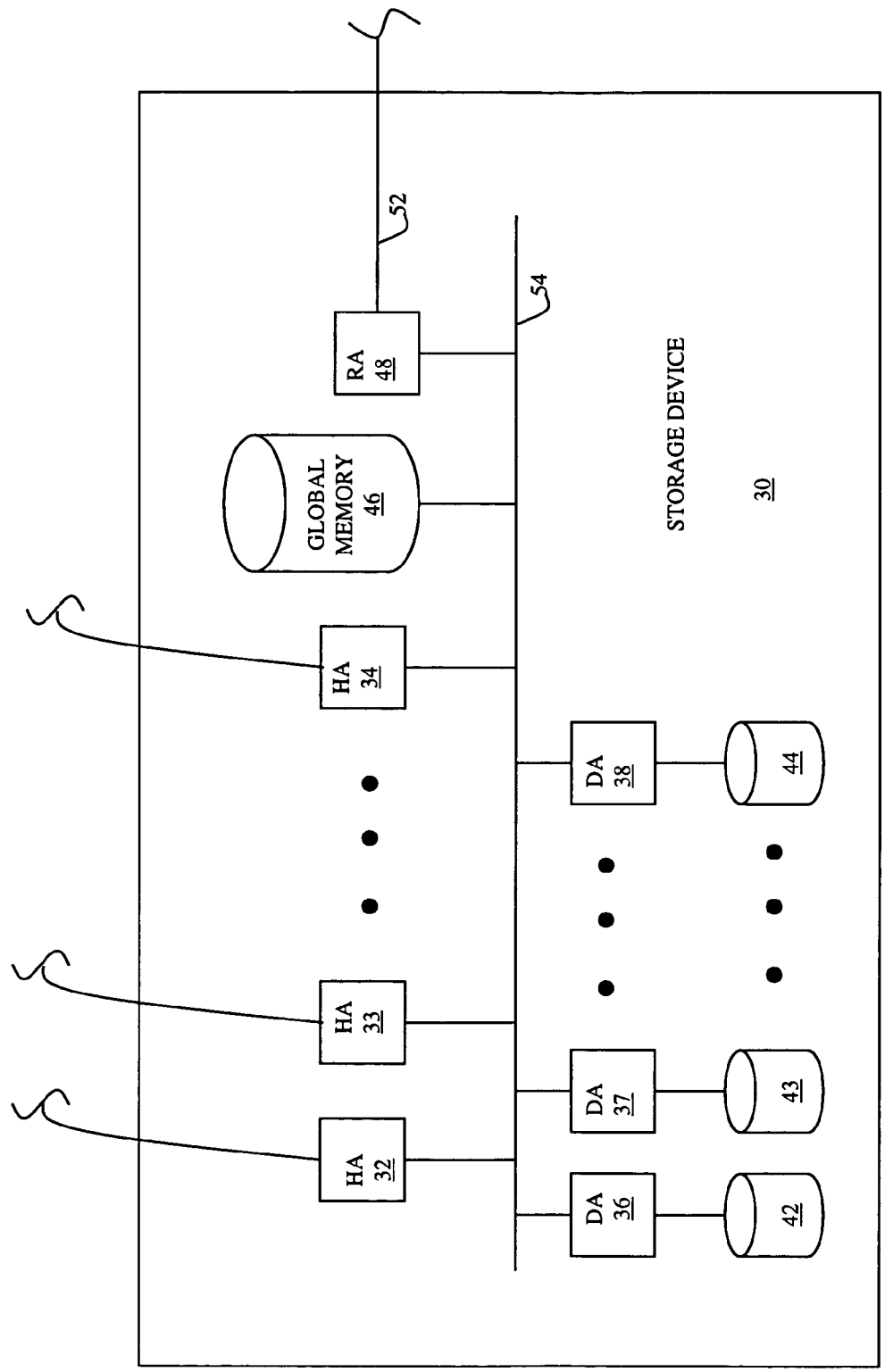
FIG. 1 is a diagram of a storage device used in connection with the system described herein.

Referring to FIG. 1, a storage device 30 includes a plurality of host adapters (HA) 32-34, a plurality of disk adapters (DA) 36-38 and a plurality of disk drives 42-44. Each of the disk drives 42-44 is coupled to a corresponding one of the DA's 36-38. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a datalink 52. The HA's 32-34, the DA's 36-38, the global memory 46 and the RA 48 are coupled to a bus 54 that is provided to facilitate communication therebetween.

Each of the HA's 32-34 may be coupled to one or more host computers (not shown) that access the storage device 30. The host computers (hosts) read data stored on the disk drives 42-44 and write data to the disk drives 42-44. The global memory 46 contains a cache memory that holds tracks of data from the disk drives 42-44 as well as storage for tables that may be accessed by the HA's 32-34, the DA's 36-38 and the RA 48.

Each of the HA's 32-34, the DA's 36-38, and the RA 48 may include a local processor and local memory to facilitate performing the functions thereof. For example, the RA 48 may include a local processor and local memory that handles requests made by one or more of the HA's 32-34 and/or the DA's 36-38 to transfer data via the datalink 52. Similarly, any one or more of the HA's 32-34 and/or the DA's 36-38 may receive data transfer requests. Since many such requests may be provided at or nearly at the same time, it is desirable to be able to process the requests concurrently in an orderly fashion. Accordingly, each of the HA's 32-34, the DA's 36-38, and the RA 48 may use an operating system to facilitate the orderly processing of tasks corresponding to the concurrent requests.

One of the services provided by an operating system is to allocate and release blocks of memory for temporary use by one or more tasks. The memory allocation system disclosed herein may be used by the operating systems of one or more of the HA's 32-34, the DA's 36-38 and the RA 48 in connection with providing dynamic memory for use by tasks thereof. However, it will be appreciated by one of ordinary skill in the art that the memory allocation system disclosed herein has broad applicability to other operating systems and other types of software that dynamically allocate and release blocks of memory.

Figure 2:
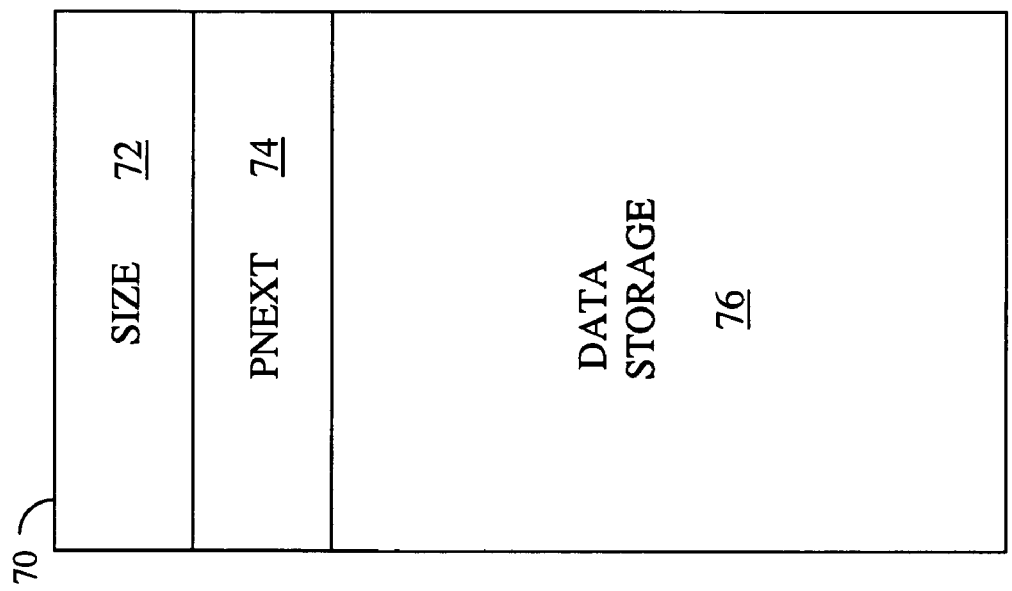
FIG. 2 shows a block of data used in connection with the system described herein.

Referring to FIG. 2, a block of memory 70 is shown as including a SIZE field 72, a PNEXT field 74 corresponding to a pointer to a next block of memory, and an area for storing data 76. As discussed in more detail elsewhere herein, the block 70 may have a particular fixed size, such as eight bytes. The SIZE field 72 represents how much data may be stored in the data storage area 76. Thus, for example, if the SIZE field 72 indicates that the block 70 contained thirty-two bytes, then the data storage area 76 would be thirty-two bytes in length. The PNEXT field 74 is used to link together blocks and is discussed in more detail elsewhere herein.

The system disclosed herein contemplates a plurality of blocks of memory of various sizes. For example, there may be a plurality of blocks that have an eight byte data storage area, a plurality having a sixteen byte data storage area, a plurality having a twenty-four byte data storage area, etc. The maximum size of the data storage area could be any amount such as, for example, 10 k. The incremental difference between successive block sizes, and the maximum block size, could be any value and may be set according to the needs of the operating system and corresponding tasks. It is possible to have the incremental difference between successive block sizes be one byte.

A task may request a block of a particular size and receive the block 70 shown in FIG. 2. Note that, in the example herein of having the incremental difference between successive block sizes be eight bytes, a task that requests an amount of storage that is not a multiple of eight bytes would receive the next higher size. For example, a task that requests one byte of memory would receive an eight byte block. A task that requests twelve bytes of memory would receive a sixteen byte block, etc. Note further, however, that, in the example herein, a task that requests an amount of memory that is a multiple of eight bytes would receive a block having a storage area that is that size. For example, a task requesting thirty-two bytes of memory would receive a thirty-two byte block.

Figure 3:
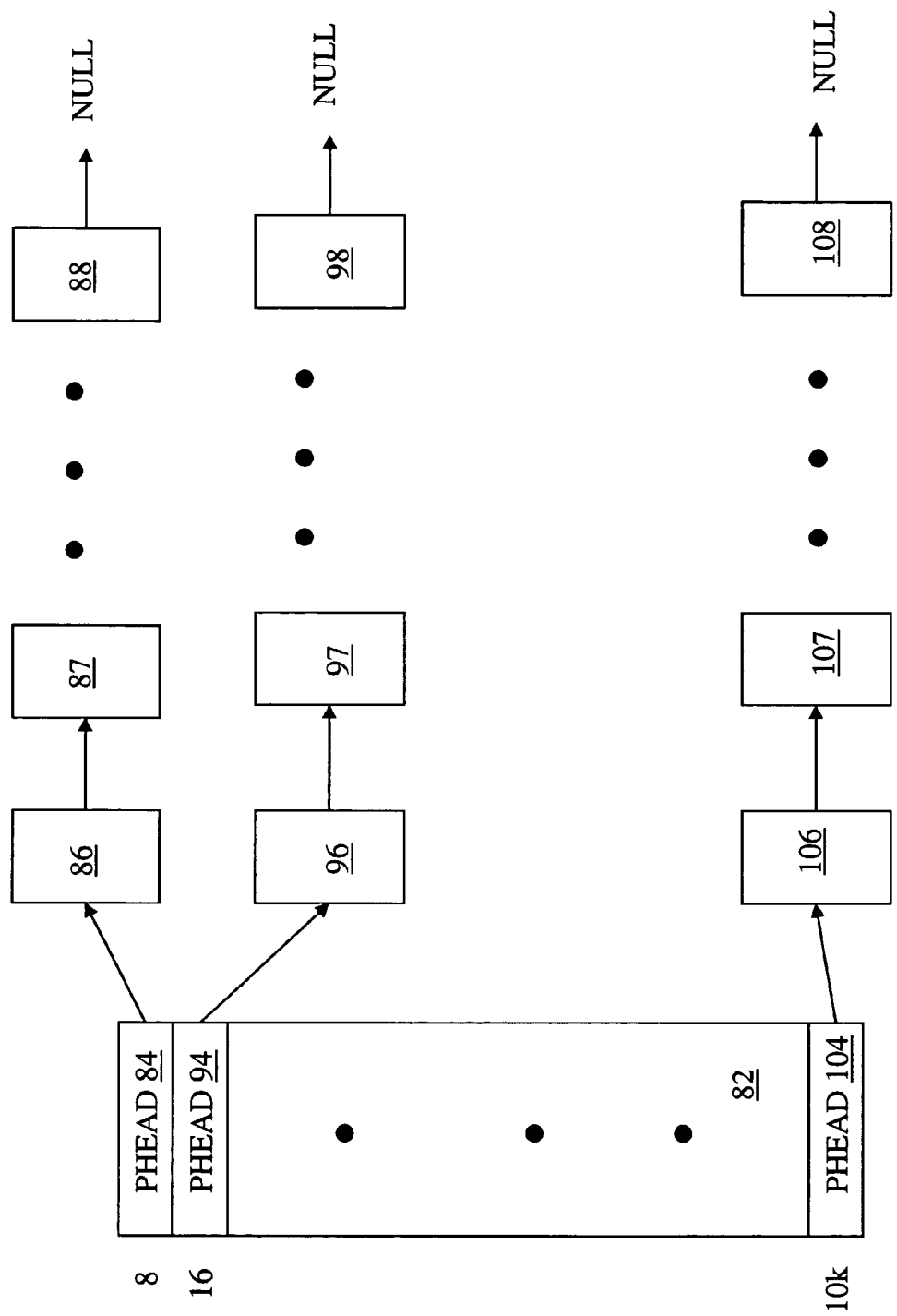
FIG. 3 shows a table and a plurality of linked lists used for managing free buckets of memory according to the system described herein.

Referring to FIG. 3, a table 82 for memory blocks having the same size is illustrated. The table 82 contains a plurality of list pointers, PHEAD 84, PHEAD 94, PHEAD 104, that represent heads of linked lists of unused blocks of memory having the same size. Thus, for example, if the block sizes are multiples of eight bytes going from eight bytes as a minimum bucket size to 10 k as a maximum bucket size, the table 82 could contain a head pointer PHEAD 84 for a linked list of unused blocks of memory 86-88 containing eight bytes of storage space. The table 82 may also contain a head pointer PHEAD 94 of a linked list of unused blocks 96-98 containing sixteen bytes of storage space and may contain a head pointer PHEAD 104 of a linked list of unused blocks 106-108 containing 10 k bytes of storage space. Of course, the table 82 may also contain head pointers for lists of unused blocks in sizes between sixteen and 10 k bytes.

The linked lists are constructed by having each of the unused blocks use the PNEXT field (discussed above in connection with FIG. 2) to point to the next unused block of the same size in the list. Thus, for example, the PNEXT field of the block 86 points to the unused block 87 and the PNEXT field of the unused block 87 points to the block 88. The PNEXT field of the block 88 points to the null pointer (as do the PNEXT fields of the buckets 98, 108) to indicate the end of the linked list. Each of the head pointers 84, 94, 104 together with the corresponding blocks of memory for each constitutes a "bucket" of memory blocks all having the same size. In some embodiments, the table 82 may be placed in memory that is faster than the memory used for the blocks of data.

Figure 4:
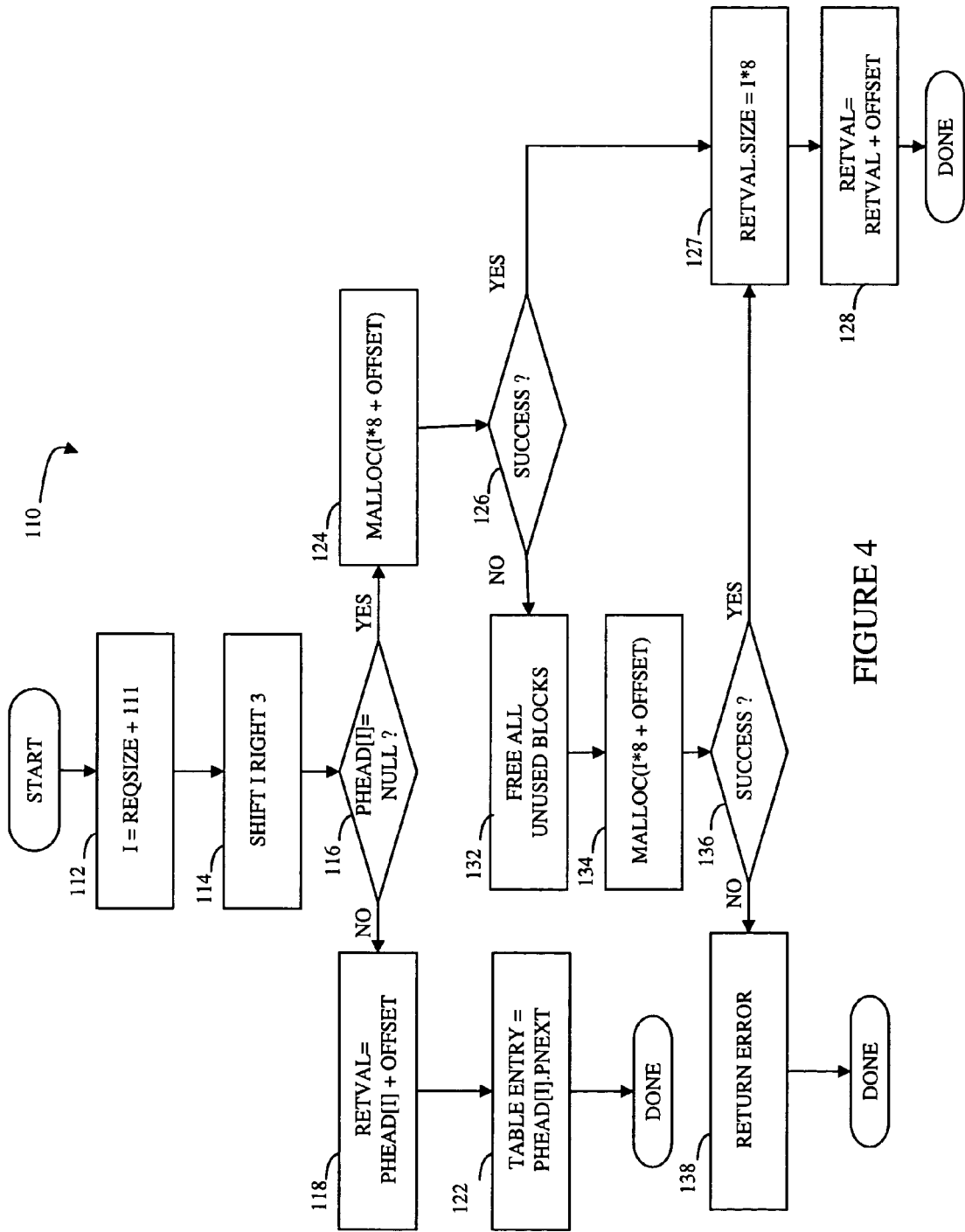
FIG. 4 is a flow chart showing steps performed in connection with a request for a block of memory according to the system described herein.

Referring to FIG. 4, a flowchart 110 illustrates steps performed in connection with an application requesting an amount of memory. The flowchart 110 assumes that the buckets are provided in multiples of eight bytes beginning with the smallest size of eight bytes. Processing begins at a first step 112 where an index variable, I, is set to the sum of the requested size of the amount of memory (REQSIZE) and binary 111(7). As discussed in more detail below, the index variable I will be used to index a table such as the table 82 illustrated in FIG. 3. Following the step 112 is a step 114 where the index variable, I, is shifted right three times. The effect of the steps 112, 114 is to properly index the table 82 to obtain the next highest size block for requests for amounts of memory that are not a multiple of eight bytes while, at the same time, obtaining a block size that is identical to the amount of memory needed when the requested amount of memory is a multiple of eight. For example, if a task requests one byte, then the result of adding seven at the step 112 is eight. Shifting that value right three places at the step 114 results in a table index of one meaning that the entry corresponding to eight byte blocks (e.g., PHEAD 84 of the table 82) will be accessed. As another example, if the number of requested bytes is eight, then the result of adding seven at the step 112 is fifteen. However, shifting fifteen right three times at step 114 results in the index variable, I, also being one, thus correctly providing an unused block having eight bytes of storage.

Following the step 114 is a step 116 where it is determined if the pointer in the table 82 points to null, meaning that there are no unused blocks corresponding to the requested amount of memory. If the pointer at the head of the table 82 does not point to null, meaning that there are available unused blocks corresponding to the requested size, then control transfers from the step 116 to a step 118 where the return value, RETVAL, which is a pointer to the requested block of memory, is set to be equal to PHEAD[I] (the pointer at the head of the linked list of unused blocks indexed in the table 82 by I) plus a value of OFFSET, which is the amount of memory space used corresponding to the SIZE and PNEXT fields of the block pointed to by PHEAD[I]. The OFFSET value may be added to prevent the task that requests the block of memory from overwriting the SIZE field of the block when the block of memory is used. Other techniques may also be employed, such as having a separate list of used blocks that include the size of each used bucket.

Following the step 118 is a step 122 where the head of the list is modified to reflect the fact that the first item on the list of unused blocks is now being used by a task, and thus is no longer an unused block. Following the step 122, processing is complete.

If it is determined at the test step 116 that the head pointer of the linked list of unused blocks points to null, meaning that there are no unused blocks having a size corresponding to the requested amount of memory, then control transfers from the step 116 to a step 124 where memory is requested from the heap. The request at the step 124 may be performed by using a conventional memory heap request routine, such as malloc. Note also that the amount of memory requested at the step 124 may be the index, I, multiplied by eight (shifted left three times) plus the OFFSET, which corresponds to the amount of memory space used by the SIZE field and the PNEXT field. Thus, the requested memory may be converted into a block that, when freed, may be returned to the appropriate linked list of unused blocks rather than being returned to the heap. In an embodiment disclosed herein, a single heap is used for the blocks of memory that correspond to the table 82.

Following the step 124 is a test step 126 where it is determined if the memory requested at the step 124 was successful. If so, then a step 127 where the SIZE field of the block of memory obtained from the heap is set to the index, I, times eight (i.e., I shifted left three times). The value placed in the SIZE field corresponds to the size of the block that is being created and will be used when the task that requested the memory returns the block to the appropriate list of unused blocks. Following the step 127 is a step 128 where the return value, RETVAL, is adjusted in a manner similar to that discussed above in connection with the step 118. Following the step 128, processing is complete.

If it is determined at the step 126 that the request for a block of memory from the heap at the step 124 was unsuccessful, then control passes from the step 126 to a step 132 where all of the unused blocks of memory from the table 82 are returned to the heap memory. Freeing the memory corresponding to the unused buckets at the step 132 is discussed in more detail hereinafter.

Following the step 132 is a step 134 where the request for an appropriate block of memory from the heap, similar to the request presented at the step 124, is made. Note, however, that since the step 134 follows the step 132 where all memory corresponding to the unused blocks was returned to the heap, it is more likely that the step 134 will successfully be able to provide the requested block of memory, since freeing all the memory corresponding to unused blocks at the step 132 should increase the amount of heap memory available. Following the step 134 is a test step 136 where its determined if the memory requested at the step 134 was successful. If so, then control transfers from the step 136 to the step 127, discussed above. Otherwise, control transfers from the step 136 to a step 138 where an error is returned. Returning the error at the step 138 indicates that the memory request by the task cannot be filled either with a block of memory from the table 82 or with memory from the heap. Following step 138, processing is complete.

Figure 5:
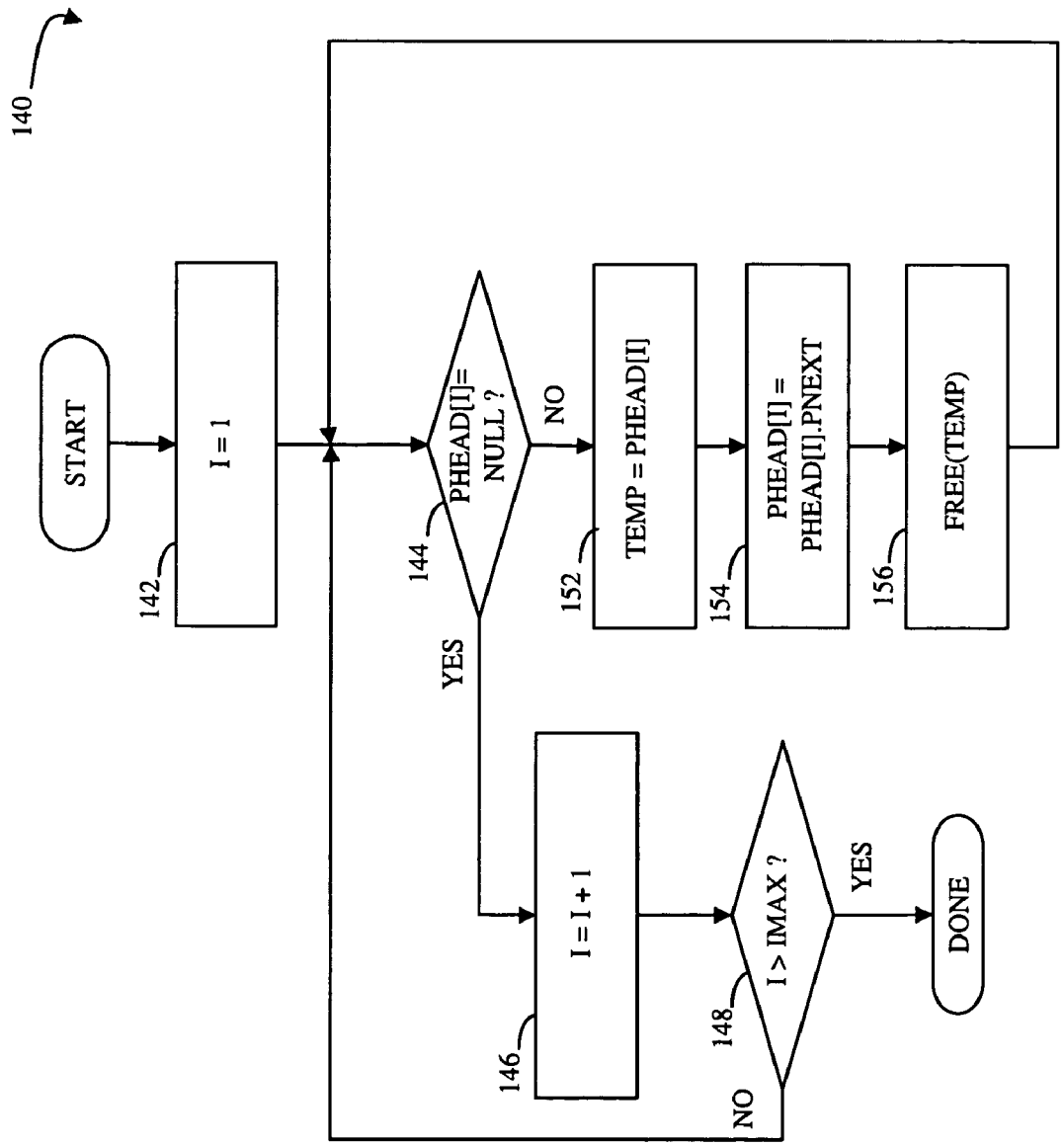
FIG. 5 is a flow chart illustrating steps performed in connection with returning all free buckets of memory back to a heap according to the system described herein.

Referring to FIG. 5, a flow chart 140 illustrates steps performed in connection with freeing all the unused blocks at the step 132 of FIG. 4. Processing begins at a first step 142 where an index, I, is set to one. The index I is used to index the table 82 that contains the list head pointers for all of the lists of unused blocks.

Following the step 142 is a test step 144 where it is determined if PHEAD [I] equals null. The test at the step 144 determines if the head pointer of a linked list of unused blocks of a particular size (the linked list corresponding to the index I) equals null. If so, then all of the free blocks corresponding to the particular size have been returned and control transfers from the step 144 to a step 146 where the index, I, is incremented. Following the step 146 is a test step 148 where it is determined if the index, I, is greater than the number of entries in the table, IMAX. If so, then processing is complete. Otherwise, control transfers from the step 148 back to the step 144 for the next iteration that processes the next entry in the table.

If it is determined at the test step 144 that the list head pointer PHEAD [I] does not equal null, then control transfers from the step 144 to a step 152 where a temporary variable, TEMP, is set to equal to PHEAD[I]. Following the step 152 is a step 154 where the head of the list is adjusted to be equal to the next unused block in the list by setting PHEAD[I] equal to PHEAD[I].NEXT. Thus, for example, if the head of the list PHEAD 84 initially points to the bucket 86, then execution at the step 154 would cause the head of the list PHEAD 84 to point to the next block 87. Following the step 154 is a step 156 where the memory pointed to by TEMP is freed. Freeing the memory at the step 156 is performed in a conventional manner by, for example, calling a heap memory management routine that will free memory. Following the step 156, control transfers back to the test step 144.

Figure 6:
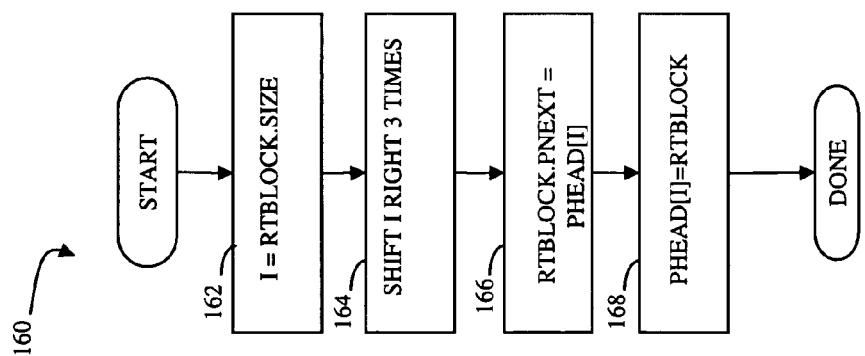
FIG. 6 is a flow chart illustrating steps performed in connection with returning a block of memory to the appropriate bucket according to the system described herein.

Referring to FIG. 6, a flow chart 160 illustrates steps performed in connection with returning a block (RTBLOCK) back to the table of unused blocks. Processing begins at a first step 162 where an index, I, is set equal to the size of the block being returned, which is found at the RTBLOCK.SIZE field. Following the step 162 is a step 164 where I is shifted right three times to obtain an index for the table 82. Following the step 164 is a step 166 where the NEXT field of the block being returned is set equal to the head of the linked list of blocks having the same size as the blocks being returned. Following the step 166 is a step 168 where the head of the linked list of blocks of the same size is set to point to the block being returned. Following step 168, processing is complete.

In one embodiment described herein, the table 82 of unused blocks may initially be empty, in which case then initial memory requests will result in obtaining memory from the heap and then returning the unused blocks to the table 82. Alternatively, it may be possible upon initialization to populate the table 82 with lists of unused blocks, as described below.

Figure 7:
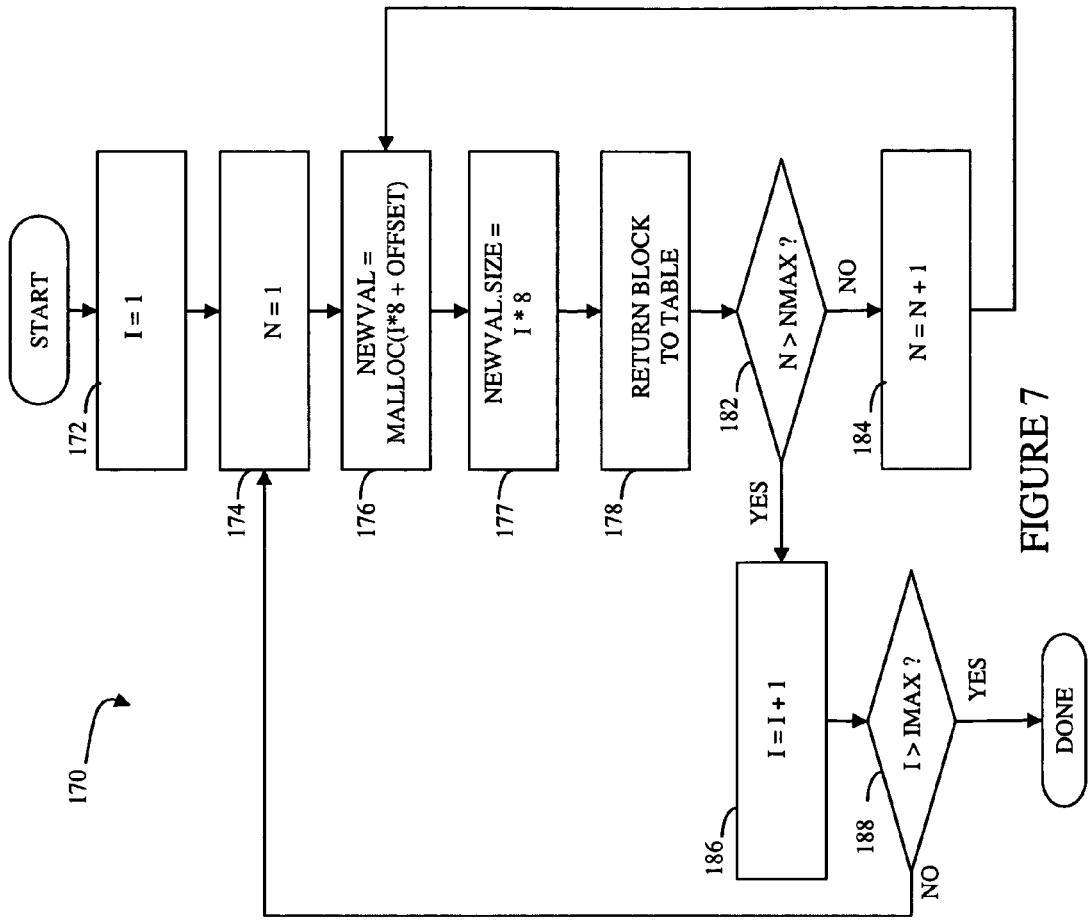
FIG. 7 is a flow chart illustrating steps performed in connection with initializing the buckets according to the system described herein.

Referring to FIG. 7, a flow chart 170 illustrates steps performed in connection with populating the table 82 with lists of unused blocks. Processing begins at a first step 172 where an index variable, I, is set to one. Following the step 172 is a step 174 where another index variable, N, is set equal to one. The index variable I represents the index in the table 82 of lists of different size blocks. The index variable N represents the number of free blocks of the same size placed on each list.

Following step 174 is a step 176 where a pointer to a block of memory, (labeled "NEWVAL" in the flow chart 170) is created by calling a conventional heap memory allocation routine, such as malloc, to allocate a number of bytes corresponding to the index I times eight plus the extra bytes (OFFSET) introduced by the SIZE field and the PNEXT field. Following the step 176 is a step 177 where the SIZE field of the new block of memory being created is set to equal I times eight. Note that the value I times eight may be obtained by shifting I left three bit positions.

Following the step 177 is a step 178 where the routine for returning unused blocks of memory is called for the new block just obtained. In an embodiment disclosed herein, the steps performed at the step 178 correspond to the flow chart 160 of FIG. 6. Following the step 178 is a test step 182 where N, the index that counts the number of unused blocks in each linked list of the same size blocks, is tested to determine if N is greater than NMAX, the maximum number of unused blocks provided on each list of the same size blocks. If not, then control transfers from the step 182 to a step 184 where N is incremented. Following the step 184, control transfers back to the step 176 to continue creating new blocks of memory.

If it is determined at the test step 182 that the value of N is greater than NMAX, (i.e., the number of unused blocks provided on each list of blocks of the same size), then control transfers from the step 182 to a step 186 where the index variable I is incremented. Following the step 186 is a test step 188 where it is determined if I is greater than IMAX, the maximum number of entries in the table 82. If so, then processing is complete. Otherwise, control transfers from the step 188 back to the step 174, discussed above.

Figure 8:
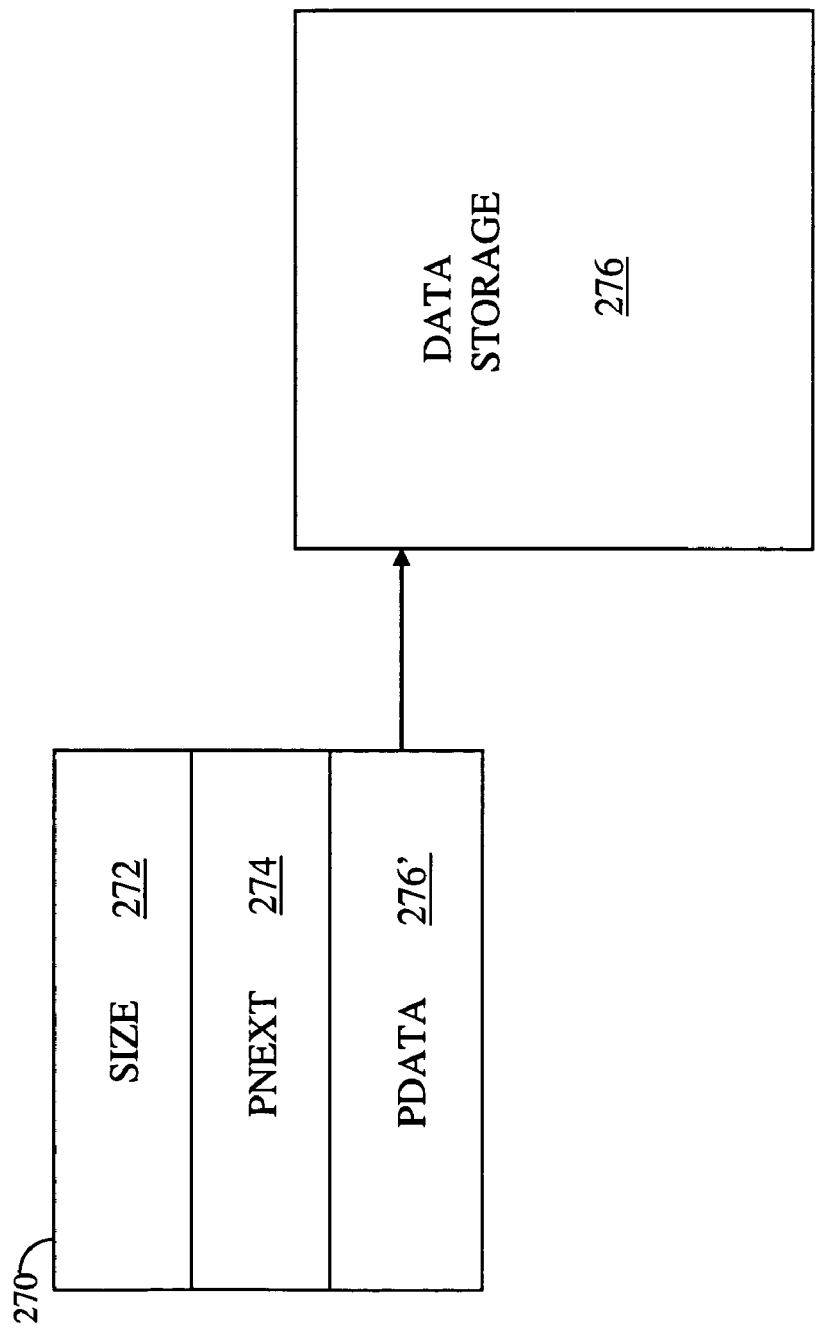
FIG. 8 shows a memory data structure according to another embodiment of the system described herein.

Referring to FIG. 8, an alternative embodiment of a memory structure 270 is shown as including a SIZE field 272, a PNEXT field 274 corresponding to a pointer to a next block of memory, and a PDATA field 276', which points to the data corresponding to the structure 270. The data for the structure 270 is provided by a data storage area 276. The SIZE field 272 and the PNEXT field 274 are like the SIZE field 72 and the PNEXT field 74 of the block 70 of FIG. 2. However, unlike the block 70 of FIG. 2, the structure 270 does not include the data with the structure 270. Instead, the structure 270 has a pointer to the data, PDATA 276', which points to the data storage area 276. In some embodiments, it may be possible that the structure 270 and the data storage area 276 are provided by different heaps, although it is also possible to use the same heap for both. In addition, it may be possible to have the data storage area 276 be provided in a faster (or slower) memory than the structure 270, thus allowing quicker access of the data storage area 276 (or structure 270). Of course, the table that contains the pointer to the structure 270 may also be provided in faster or slower memory.

Note also that the structure 270 and the data storage area 276 may be accessed in parallel by parallel processors that access the structure 270 and the data storage area 276 at the same time. In other words, the structures and the data corresponding to the structures may be stored in separate memories that may be manipulated independently and in parallel. This may be advantageous for multi-processor/parallel processor architectures. Of course, it is also possible to have the structure 270 and the data storage area 276 reside in the same memory and be accessed by one processor, in series. Note that the table 82 of FIG. 3 can be used in connection with the structure 270 of FIG. 8 in the same way that the table 82 is used with the block 70 of FIG. 2.

Figure 9:
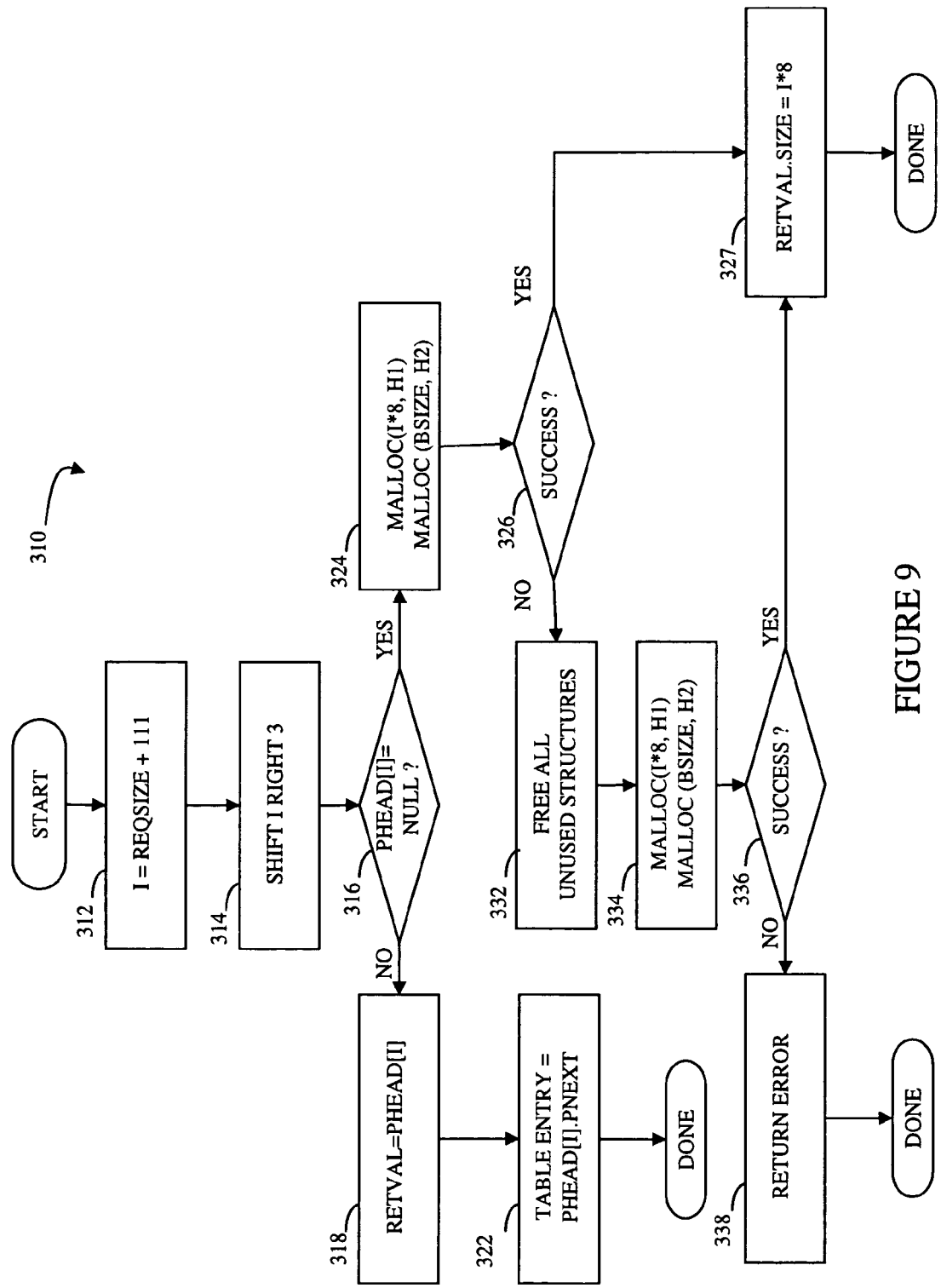
FIG. 9 is a flowchart showing steps performed in connection with a request for a block of memory according to another embodiment of the system described herein.

Referring to FIG. 9, a flowchart 310 illustrates steps performed in connection with an application requesting a block of memory using the structure 270 of FIG. 8. The flowchart 310 assumes that the blocks of memory are provided in multiples of eight bytes beginning with the smallest size of eight bytes. Processing begins at a first step 312 where an index variable, I, is set to the sum of the requested amount of memory (REQSIZE) and binary 111(7). As discussed in more detail below, the index variable I will be used to index a table such as the table 82 illustrated in FIG. 3. Following the step 312 is a step 314 where the index variable, I, is shifted right three times.

Following the step 314 is a step 316 where it is determined if the pointer at location I in the table 82 points to null, meaning that there are no unused structures corresponding to the requested size. If the pointer at the head of the table 82 does not point to null, meaning that there are available unused blocks of memory corresponding to the requested size, then control transfers from the step 316 to a step 318 where the return value, RETVAL, which is a pointer to the requested block of memory, is set to be equal to PHEAD[I] (the pointer at the head of the linked list of unused structures indexed in the table 82 by I). Note that, for an embodiment disclosed herein, the process that receives the pointer to a bucket (RETVAL) will use RETVAL.PDATA as a pointer to the data. Following the step 318 is a step 322 where the head of the list in the table is modified to reflect the fact that the first item on the list of unused structures is now being used, and thus is no longer an unused structure. Following the step 322, processing is complete.

If it is determined at the test step 316 that the head pointer of the linked list of unused structures points to null, meaning that there are no unused structures having a size corresponding to the requested block of memory, then control transfers from the step 316 to a step 324 where memory is requested from the heap(s). The request at the step 324 may be performed by using a conventional memory heap request routine, such as malloc. Note also that there are two memory requests at the step 324: a first request from heap H1 for memory for the structure and a second request from heap H2 for memory for the data storage area. As discussed above, the heaps H1 and H2 may correspond to different memories or the same memory. If the same memory is used for H1 and H2, then one heap (i.e., H1 or H2) may be used. In some embodiments, the storage for the structures may be preallocated, and thus only the memory for the data storage area needs to be allocated at the step 324. Also note that, in some embodiments, H1 and H2 could be the same heap.

Following the step 324 is a test step 326 where it is determined if the memory requested at the step 324 was successful. If so, then control passes to a step 327 where the SIZE field of memory for the data storage area is set to the index, I, times eight (i.e., I shifted left three times). The value placed in the SIZE field corresponds to the size of the data storage area associated with the structure that is being created and will be used when the task that requested the memory returns the memory to the table of unused blocks of memory. Following the step 327, processing is complete.

If it is determined at the step 326 that the request(s) for memory from the heap(s) at the step 324 were unsuccessful, then control passes from the step 326 to a step 332 where blocks of memory used by all the unused structures are returned to the heap memory. Freeing the memory corresponding to the unused structures at the step 332 is discussed above in connection with FIG. 5. Note, however, that, for the embodiment of FIGS. 8 and 9, the step 156 would also include a substep corresponding to freeing TEMP.PDATA prior to freeing TEMP.

Following the step 332 is a step 334 where the request for appropriate block(s) of memory from the heap(s), similar to the request presented at the step 324, is made. Note, however, that since the step 334 follows the step 332 where all memory corresponding to the unused structures was returned to the heap(s), it is more likely that the step 334 will successfully be able to provide the requested memory, since freeing all the memory corresponding to unused structures at the step 332 should increase the amount of heap memory available. Following the step 334 is a test step 336 where its determined if the memory requested at the step 334 was successful. If so, then control transfers from the step 336 to the step 327, discussed above. Otherwise, control transfers from the step 336 to a step 338 where an error is returned. Returning the error at the step 338 indicates that the memory request by the task cannot be filled either with a structure or with memory from the heap(s). Following step 338, processing is complete.

Figure 10:
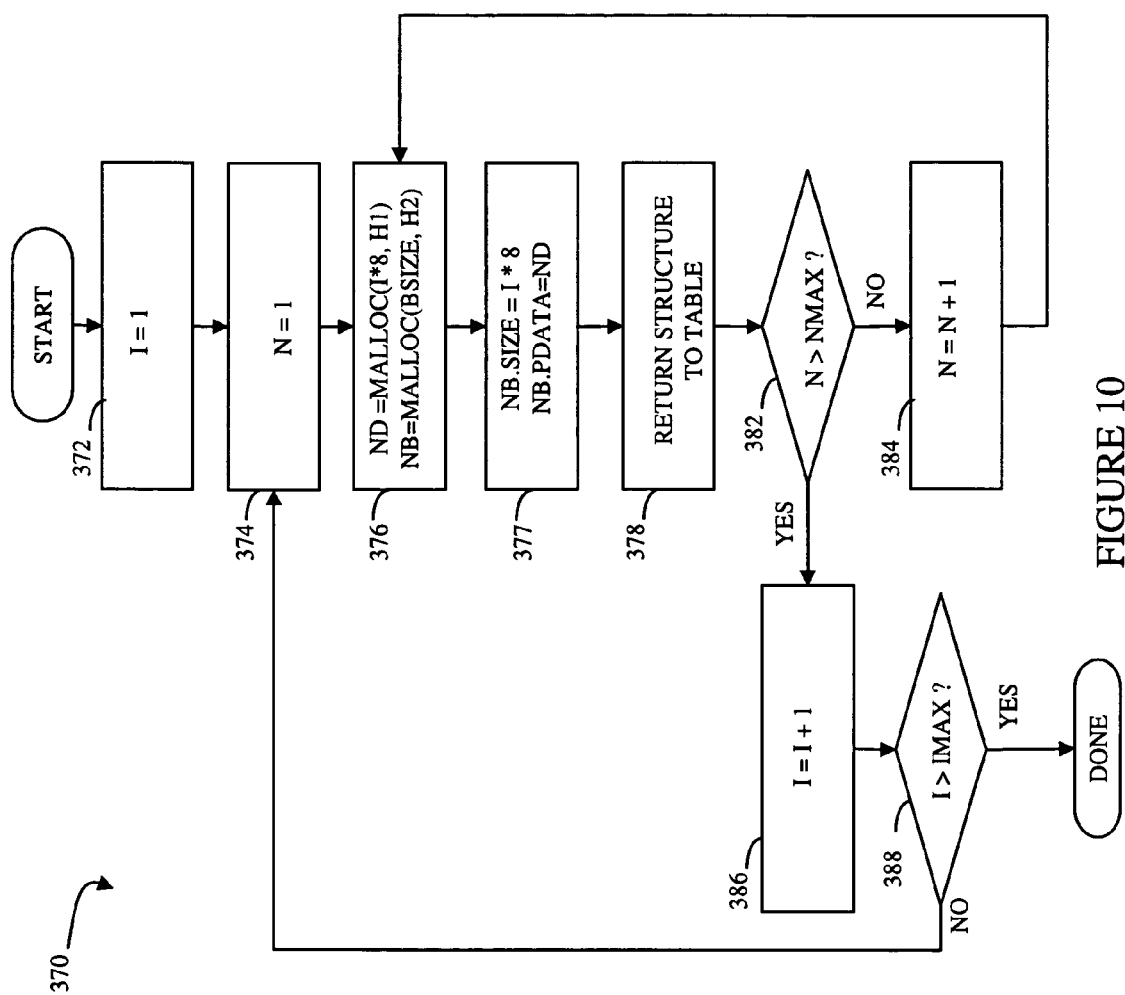
FIG. 10 is a flowchart illustrating steps performed in connection with initializing the buckets according to another embodiment of the system described herein.

Referring to FIG. 10, a flow chart 370 illustrates steps performed in connection with populating the table 82 with lists of unused structures in connection with the structure 270 of the embodiment of FIG. 8. Processing begins at a first step 372 where an index variable, I, is set to one. Following the step 372 is a step 374 where another index variable, N, is set equal to one. The index variable I represents the index in the table 82 of lists of structures corresponding to the same size data storage area (i.e. each bucket). The index variable N represents the number of free structures placed on each list.

Following step 374 is a step 376 where two pointers are created by calling a conventional heap memory allocation routine, such as malloc. The first pointer, ND, represents a pointer to a data storage area provided by the heap H1. The second pointer, NB, represents storage for the structure. The amount of memory allocated for ND is the index I times 8 (i.e., I shifted left three times). The amount of memory allocated for NB is the amount of memory taken up by a structure, which is constant for an embodiment disclosed herein. Following the step 376 is a step 377 where the SIZE field of the new structure being created is set to equal I times eight. Note that the value I times eight may be obtained by shifting I left three bit positions. Also at the step 377, the pointer NB.PDATA, which is the field of the structure that points to the data storage area, is set equal to ND.

Following the step 377 is a step 378 where the routine for returning unused memory to the table is called for the structure created by the previous steps. In an embodiment disclosed herein, the steps performed at the step 378 correspond to the flow chart 160 of FIG. 6. Following the step 378 is a test step 382 where N, the index that counts the number of unused structures in each linked list, is tested to determine if N is greater than NMAX, the maximum number of structures provided on each list corresponding to the same size data storage area. If not, then control transfers from the step 382 to a step 384 where N is incremented. Following the step 384, control transfers back to the step 376 to continue creating new structures.

If it is determined at the test step 382 that the value of N is greater than NMAX, (i.e., the maximum number of structures provided for each list), then control transfers from the step 382 to a step 386 where the index variable I is incremented. Following the step 386 is a test step 388 where it is determined if I is greater than IMAX, the maximum number of entries in the table 82. If so, then processing is complete. Otherwise, control transfers from the step 388 back to the step 374, discussed above.

Figure 11:
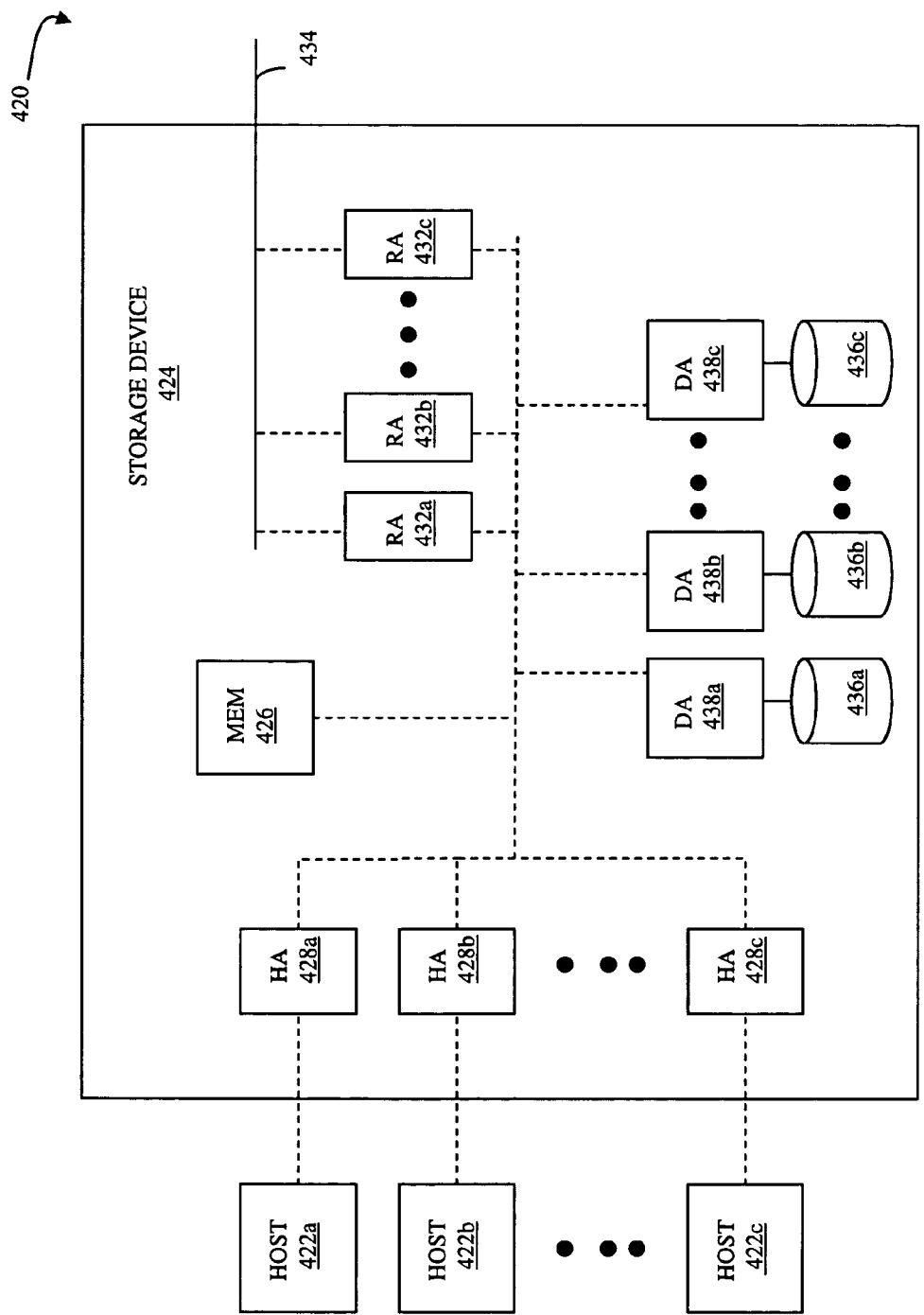
FIG. 11 is a schematic diagram showing a plurality of hosts and a data storage device used in connection with the system described herein.

Referring to FIG. 11, a diagram 420 shows a plurality of hosts 422a-22c coupled to a data storage device 424. The data storage device 424 includes an internal memory 426 that facilitates operation of the storage device 424 as described elsewhere herein. The data storage device also includes a plurality of host adaptors (HA's) 428a-428c that handle reading and writing of data between the hosts 422a-422c and the storage device 424. Although the diagram 420 shows each of the hosts 422a-422c coupled to each of the HA's 428a-428c, it will be appreciated by one of ordinary skill in the art that one or more of the HA's 428a-428c may be coupled to other hosts.

The storage device 424 may include one or more RDF adapter units (RA's) 432a-432c. The RA's 432a-432c are coupled to an RDF link 434 and are similar to the HA's 428a-428c, but are used to transfer data between the storage device 424 and other storage devices (not shown) that are also coupled to the RDF link 434.

The storage device 424 may also include one or more disks 436a-436c, each containing a different portion of data stored on the storage device 424. Each of the disks 436a-436c may be coupled to a corresponding one of a plurality of disk adapter units (DA) 438a-438c that provides data to a corresponding one of the disks 436a-436c and receives data from a corresponding one of the disks 436a-436c. Note that, in some embodiments, it is possible for more than one disk to be serviced by a DA and that it is possible for more than one DA to service a disk.

The logical storage space in the storage device 424 that corresponds to the disks 436a-436c may be subdivided into a plurality of volumes or logical devices. The logical devices may or may not correspond to the physical storage space of the disks 436a-436c. Thus, for example, the disk 36a may contain a plurality of logical devices or, alternatively, a single logical device could span both of the disks 436a, 436b. The hosts 422a-422c may be configured to access any combination of logical devices independent of the location of the logical devices on the disks 436a-436c.

One or more internal logical data path(s) exist between the DA's 438a-438c, the HA's 428a-428c, the RA's 432a-432c, and the memory 426. In some embodiments, one or more internal busses and/or communication modules may be used. In some embodiments, the memory 426 may be used to facilitate data transferred between the DA's 438a-438c, the HA's 428a-428c and the RA's 432a-432c. The memory 426 may contain tasks that are to be performed by one or more of the DA's 438a-438c, the HA's 428a-428c and the RA's 432a-432c, and a cache for data fetched from one or more of the disks 436a-436c. Use of the memory 426 is described in more detail hereinafter.

The storage device 424 may be provided as a stand-alone device coupled to the hosts 422a-422c as shown in FIG. 11 or, alternatively, the storage device 424 may be part of a storage area network (SAN) that includes a plurality of other storage devices as well as routers, network connections, etc. The storage device may be coupled to a SAN fabric and/or be part of a SAN fabric.

Figure 12:
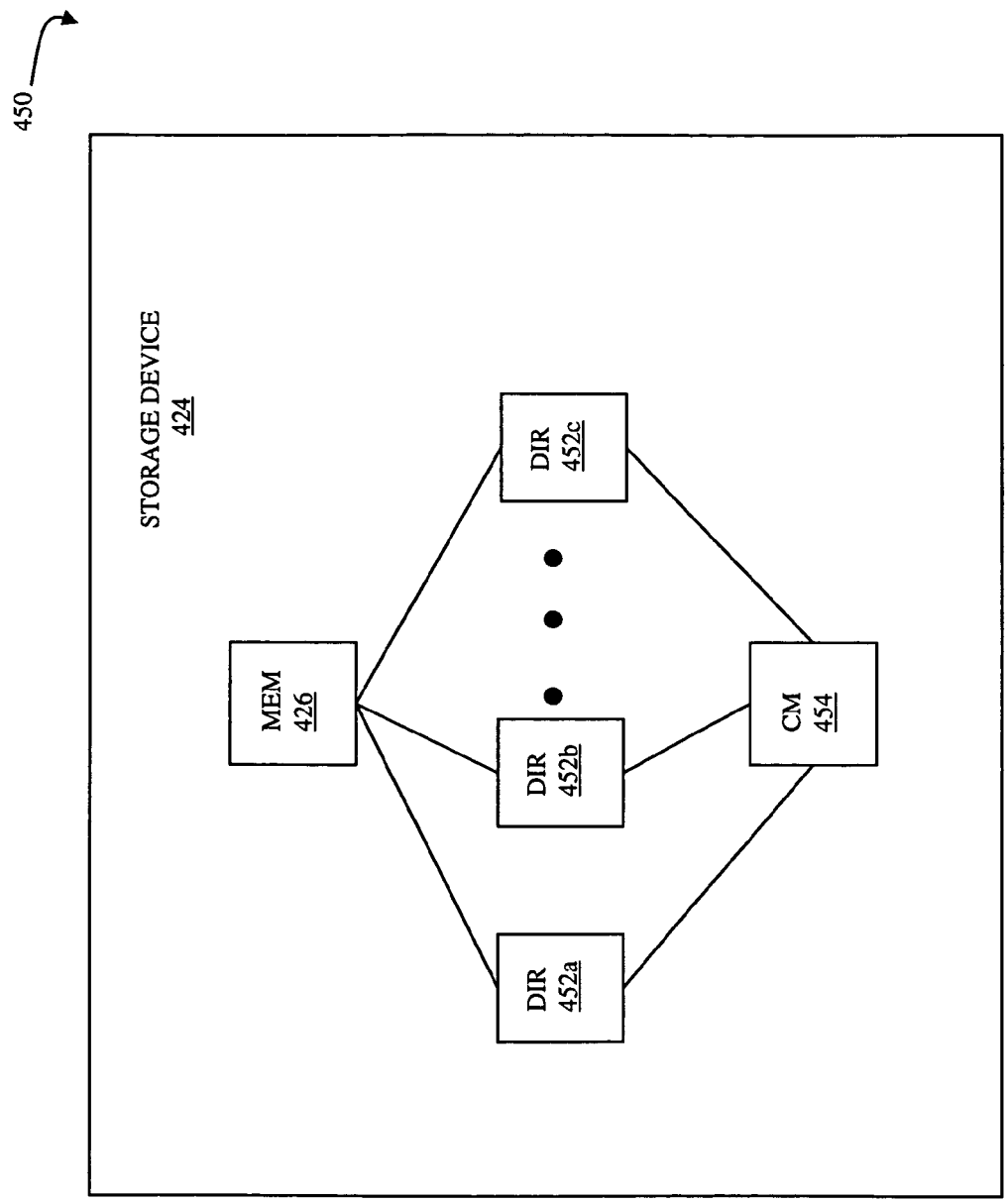
FIG. 12 is a schematic view showing a storage device, memory, a plurality of directors, and a communication module according to the system described herein.

Referring to FIG. 12, a diagram 450 illustrates an embodiment of the storage device 424 where each of a plurality of directors 452a-452c are coupled to the memory 426. Each of the directors 452a-452c represents one of the HA's 428a-428c, RA's 432a-432c, or DA's 438a-438c. In an embodiment disclosed herein, there may be up to sixteen directors coupled to the memory 426. Of course, for other embodiments, there may be a higher or lower maximum number of directors that may be used.

The diagram 450 also shows an optional communication module (CM) 454 that provides an alternative communication path between the directors 452a-452c. Each of the directors 452a-452c may be coupled to the CM 454 so that any one of the directors 452a-452c may send a message and/or data to any other one of the directors 452a-452c without needing to go through the memory 426. The CM 454 may be implemented using conventional MUX/router technology where a sending one of the directors 452a-452c provides an appropriate address to cause a message and/or data to be received by an intended receiving one of the directors 452a-452c. In addition, a sending one of the directors 452a-452c may be able to broadcast a message to all of the other directors 452a-452c at the same time.

Figure 13:
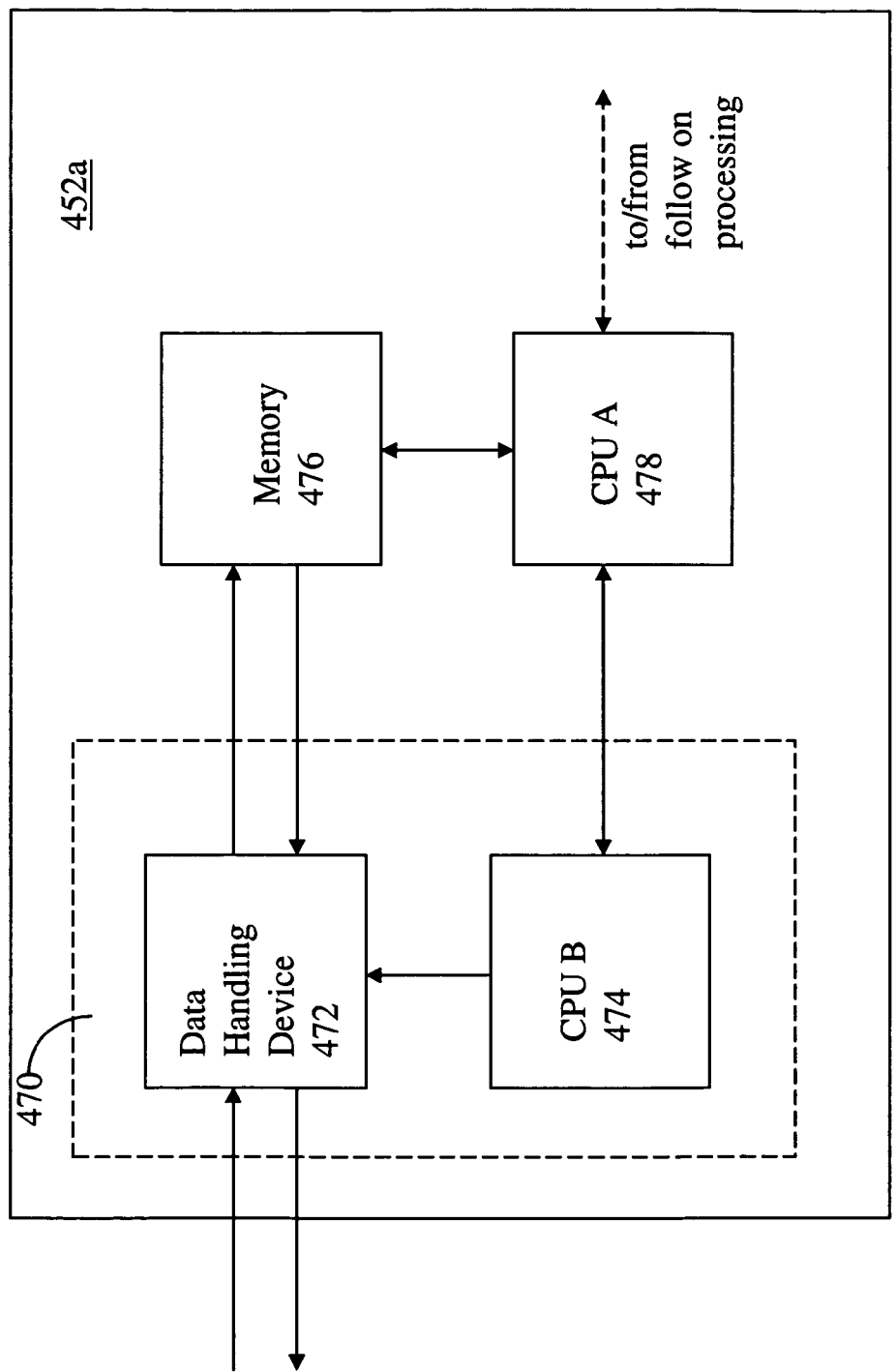
FIG. 13 is a schematic illustrating a director in more detail according to the system described herein.

Referring now to FIG. 13, shown is an example of an embodiment of a director illustrating in more detail components that may be included therein. It should be noted that the components of FIG. 13 may represent a portion of those components that may be included in an embodiment of the director. The particular components included in the example of FIG. 13 have been selected for the purposes of illustrating techniques described herein.

The director 452a includes a data interface device 470, a memory 476, and CPU A 478. Included in the data interface device 470 is a data handling device 472 and CPU B 474. The data interface device 470 may be, for example, an HA or an RA, which may process data transmitted using the bidirectional communication path as illustrated in FIG. 13. CPU B in this example may control the data handling device 472 by issuing program instructions to the data handling device 472. The CPU B may, for example, provide instructions to the data handling device 472 in connection with processing incoming and/or outgoing data for the director 452a. The data handling device 472 may process incoming data by receiving the incoming data and placing it in a portion of the memory 476. At a later point in time, CPU A may retrieve the data from the memory 476 for additional processing. As just described, data incoming with respect to the director 452a may be received by the data handling device 472, placed in the memory 476, subsequently retrieved by the CPU A 478, and forwarded onward for further processing. Outgoing data of the director 452a may follow a reverse communication path in which the CPU A 478 may place data in the memory 476. The data handling device 472 may receive instructions from CPU B 474 to retrieve the data from the memory 476 and forward it out of the director 452a. Additionally, as illustrated in FIG. 13, CPU A and CPU B may communicate in connection with performing any one of a variety of different tasks within the director 452a. CPU A 478 may manage the memory 476 in connection with incoming and outgoing data with respect to the director 452a. At some later point in time, CPU A may be reset.

What will now be described are processing steps that may be performed in connection with a special reset mode as may be performed by CPU A 478 such that CPU A may be reset without disrupting memory operations being performed by the data interface device 470 using portions of the memory 476. For example, a reset of CPU A in a special reset mode as will be described in the following paragraphs will allow the data interface device 470 to continue processing and using the memory 476 to handle incoming data. The incoming data may be stored in one or more buffers allocated from portions of the shared memory 476. The processing performed by device 470 may continue without disruption while the special reset mode of CPU A is occurring.

The one or more heap structures as described elsewhere herein may be stored within the memory 476. Memory from each of the one or more heaps may be allocated for use among one or more of the multiple independent processing units such as for use by CPU B and CPU A. In other words, the one or more heaps may represent a portion of the shared memory for 76 that is shared among multiple independent processing units. Utilizing a special reset mode as will be described in the following paragraphs provides for continuous operation of those other processing units which have not been reset.

In connection with the special reset mode, processing steps may be performed in an embodiment when allocating requested memory, for example, as may be performed by a memory allocation routine. When allocating memory from one or more of the heaps, a designation may be made as to whether the allocation routine should preserve the contents of a current memory allocation in the event of subsequent special mode reset. The code, for example, requesting the memory allocation may specify an input parameter. The input parameter may indicate whether the memory which is to be allocated by the allocation routine should be preserved in the event a subsequent special mode reset is performed. If such an indication is made in connection with a memory request, the routine performing the memory allocation may use any one of a variety of different techniques to note that the allocated memory should be preserved in the event of special mode reset. In one embodiment, information regarding the allocated memory may be included as an element on an allocation list. The allocation list of elements denotes one or more locations from a heap whose contents are to be preserved in the event of a special mode reset. Each heap may have its own list of associated locations.

When portions of allocated memory are returned for subsequent reuse such as, for example, returned to the table of FIG. 3, a determination may be made as to whether the portion being returned was previously placed in the allocation list. In the event the previously allocated memory portion being returned is included on the allocation list, the portion's corresponding list entry may be removed from the allocated list. Since the previously allocated portion is being returned for reuse, preservation of that portion is no longer needed in the event of a special mode reset.

In the event that a special mode reset is performed, initialization processing may be performed to preserve the memory portions of a heap as designated in the allocation list for the heap. Prior to any memory being allocated from the heap, processing may be performed so that the memory portions designated in the allocation list are not included in the heap for subsequent allocations.

The particular memory allocations designated as being preserved in the event of a special reset mode processing may vary in accordance with each particular embodiment. For example, in one embodiment referring again to FIG. 13, buffers designated for use by CPU B in connection with received data may be included on the allocation list of entries. Other memory allocation requests that may be made, for example, by an application in connection with application processing may not be designated as ones for preservation in the event of special reset mode processing.

Figure 14:
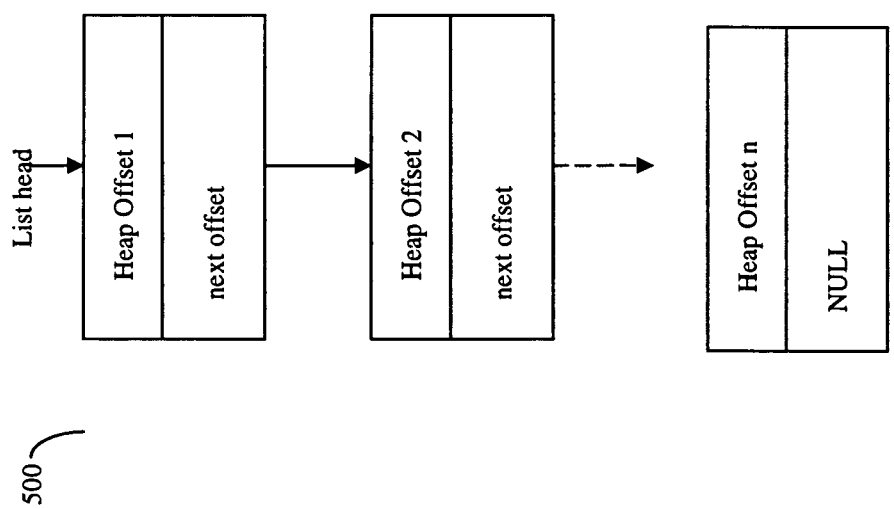
FIG. 14 is an example representation of a list of heap offsets of locations to be preserved in the event of a soft reset.

Referring now to FIG. 14, shown is an example of an embodiment of an allocation list. The example includes a data structure 500 that may be used in connection with saving the allocation entries on the allocation list. The list may include an entry for each heap offset location having contents which are to be preserved in the event of a special reset mode.

It should be noted that the heap offset included in an entry in the list 500 may represent a starting location or address within the heap such as, for example, representing the start address of the data structure 70 included in FIG. 2. Additionally as also described herein, different data structures may be used in connection with representing an allocated portion of memory. Also described herein in FIG. 8 is another representation of an allocated portion of memory. In connection with a representation of FIGS. 2 and 8, one or more heaps may be used in connection with dynamic memory allocation. For example, in an embodiment using the structures of FIG. 8 with multiple heaps, an entry in a first list may represent a location in a first heap, for example, the address of the start of the data structure 270 shown in FIG. 8. An entry in a second list may represent the starting address of an allocation portion for the data storage location 276.

It should be noted that other embodiments may use other data structures in connection with representing heap locations to be preserved in the event of special reset mode processing.

The special reset mode processing described herein may be performed prior to any type of a destructive memory test since processing described herein relies upon the contents of the heap or heaps having their contents unmodified.

Figure 15:
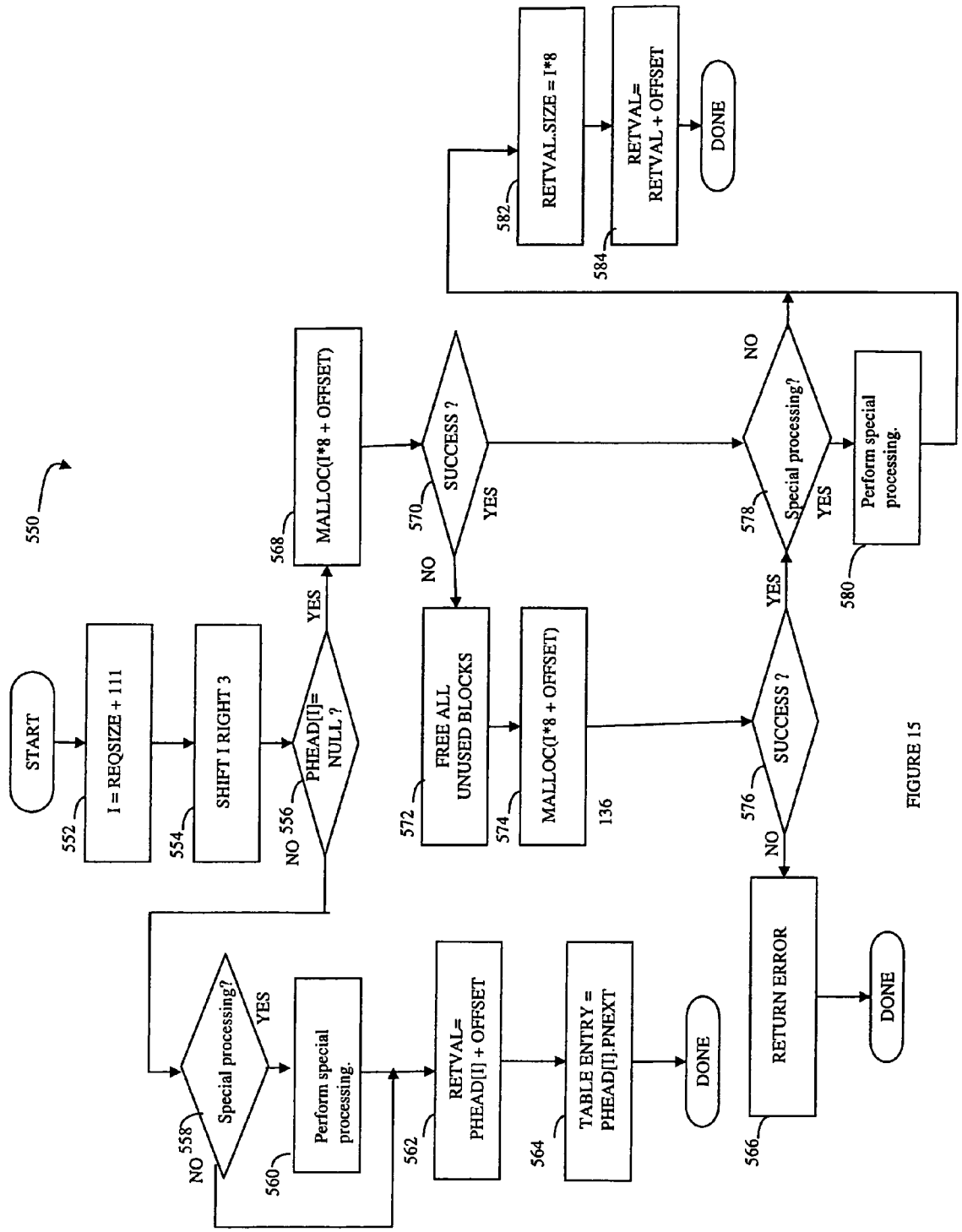
FIG. 15 is a flowchart of processing steps performed in connection with a request for a block of memory according to the system described herein.
Figure 16:
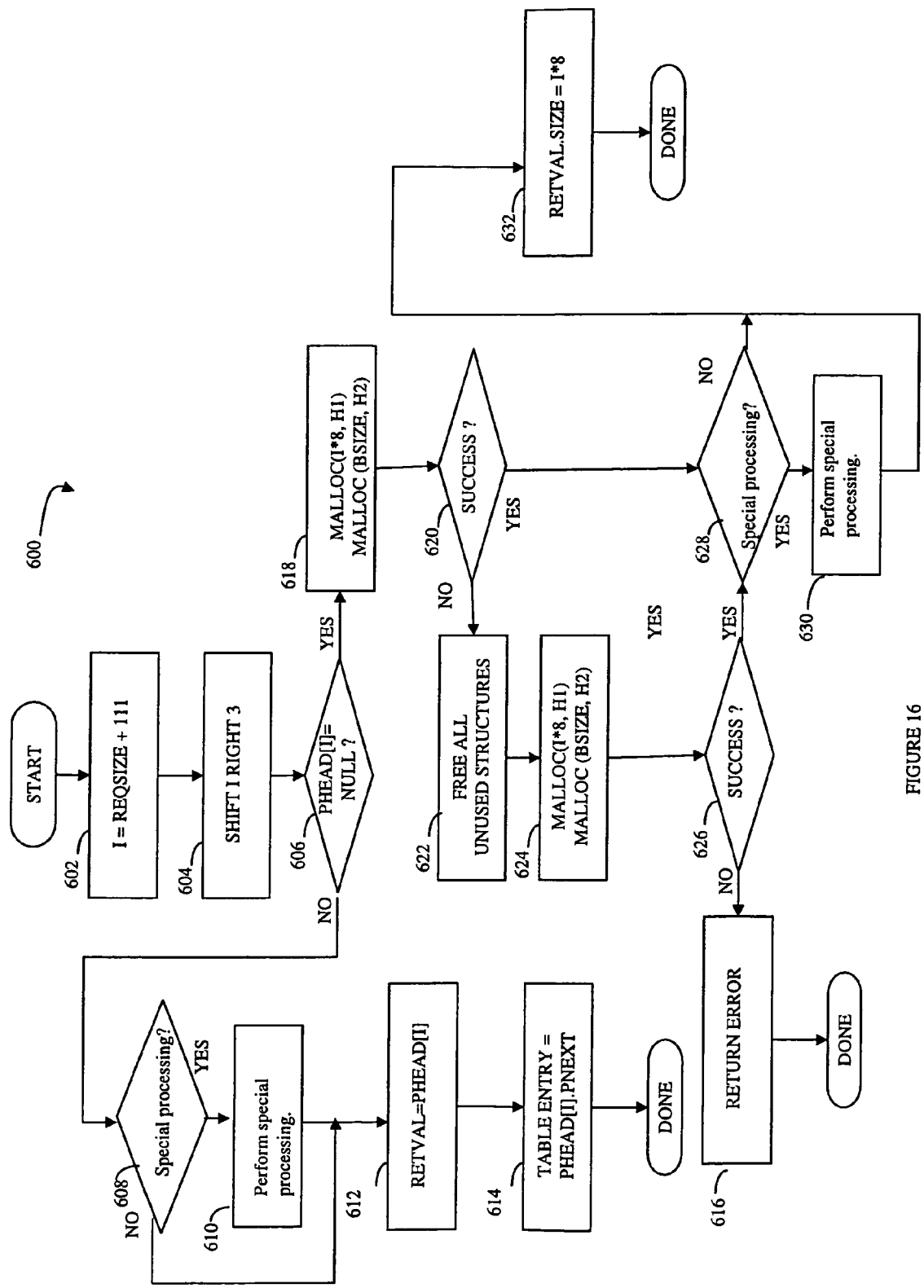
FIG. 16 is a flowchart of processing steps performed in connection with a request for a block of memory according to another embodiment of the system described herein.

What will now be described in connection with FIGS. 15 and 16 are processing steps that may be performed in connection with allocation of memory in different embodiments in order to preserve designated memory allocations if special reset mode processing is subsequently performed.

As previously described, when portions of memory are allocated from the one or more heaps, an input parameter may be specified with the memory allocation request. The input parameter may indicate whether the current allocation being made is to be saved on the allocation list as illustrated in FIG. 14.

Referring now to FIG. 15, shown is a flowchart of processing steps that may be performed in an embodiment in connection with allocating memory in a system using the data structure of FIG. 2. It should be noted that the processing steps of FIG. 15 are similar to those as described elsewhere herein in connection with FIG. 4 with additional processing steps to save the location of the current allocation on an allocation list. FIG. 15 includes the processing steps as described herein in connection with FIG. 4 with the addition of steps 578, 580, 558 and 560. Processing at step 578 determines if an input parameter indicates whether the current allocation being made is to be saved through the use of special processing. If not, control proceeds with regular processing. Otherwise, control proceeds to step 580 to perform special processing. In one embodiment using the allocation list of FIG. 14, step 580 processing includes saving a heap address for the current allocation in the next list entry of the allocation list prior to continuing processing. Similarly, step 558 makes a determination as to whether a current allocation being made is to have its contents preserved in the event of a special reset mode. If so, control proceeds to step 560 to perform special processing. In the embodiment using the allocation list, step 560 processing includes saving the heap address in the next list entry for the current allocation prior to continuing processing. Otherwise if step 558 indicates that the current allocation is not to be preserved in the event of special reset mode processing, control proceeds from step 558 to regular processing without saving a heap location for the current memory allocation.

In connection with another embodiment not using the allocation list, a marker field may be added to the data structure representing a portion of memory, for example, to the data structure of FIG. 2. The marker field may be added as a new first field to the data structure. The marker field may be set to a special value when the contents of the associated memory portion is to be preserved. Otherwise, the marker field contains a different non-marker value. In yet another embodiment not using the allocation list, the marker field may be represented using the pnext field in which the pnext field is set to the special marker value when the contents of the associated memory location are to be preserved. In connection with either of these latter two embodiments not using the allocation list, processing of steps 560 and 580 include assigning the designated marker field of the memory block the marker value.

Referring now to FIG. 16, shown is a flowchart of processing steps that may be performed in connection with performing a memory allocation in an embodiment utilizing the data structures as previously described elsewhere herein in connection with FIG. 8. It should be noted that the processing steps of FIG. 16 include the processing steps previously described in connection with FIG. 9 for memory allocation with additional processing steps 628, 630, 608 and 610. The additional processing steps of FIG. 16 perform functionality similar to that as described in connection with the additional steps of FIG. 15. For example, in an embodiment using the allocation list, on the basis of an incoming parameter or indicator, step 628 may determine whether a designation has been made to save the current allocation on a list of entries such as illustrated in FIG. 14. The list of entries designates memory allocations whose contents are to be preserved in the event of special reset mode processing. If step 628 evaluates to no, processing continues with regular memory allocation processing. Otherwise, control proceeds to step 630 to save the heap address for the current memory allocation as the next entry in the allocation list before continuing processing. Processing at step 608 also makes a determination similar to that as described herein in connection with 628. A determination is made at step 608 as to whether a heap address for the current allocation is to be saved in a list of allocated entries. If so, control proceeds to step 610 to save a heap address for the current allocation in a next list entry before continuing processing. Otherwise, control proceeds from step 608 to continue processing without saving the heap address for the current allocation on the allocation list.

In connection with another embodiment that does not use the allocation list and utilizes a marker field, processing of steps 610 and 630 initialize the marker field to include a special marker value. It should be noted that, as described elsewhere herein, the marker field may be an additional field in the data structure associated with a portion of memory, or may alternatively be implemented using the pnext field as the marker field.

It should be noted that in an embodiment performing steps of FIG. 16, processing at steps 610 and 630 may perform special processing in order to preserve more than one heap location associated with more than one heap. An embodiment using two heaps with the data structure of FIG. 8 may place a first entry on a first list associated with a first heap for a memory allocation of an element 270. A second entry may be included on a second list associated with a second heap for a memory allocation of an element 276.

Processing in connection with the memory allocation operations as described in connection with FIGS. 15 and 16 provide for noting those allocated memory portions whose contents are to be preserved in the event of special reset mode processing.

In the event that an allocated portion is returned to the free list for reallocation, processing steps may be performed in an embodiment to determine if an allocated portion of memory being returned was previously placed on an allocation list associated with a heap. If so, prior to returning the element to the free list, the allocated entry is removed from the allocation list.

Figure 17:
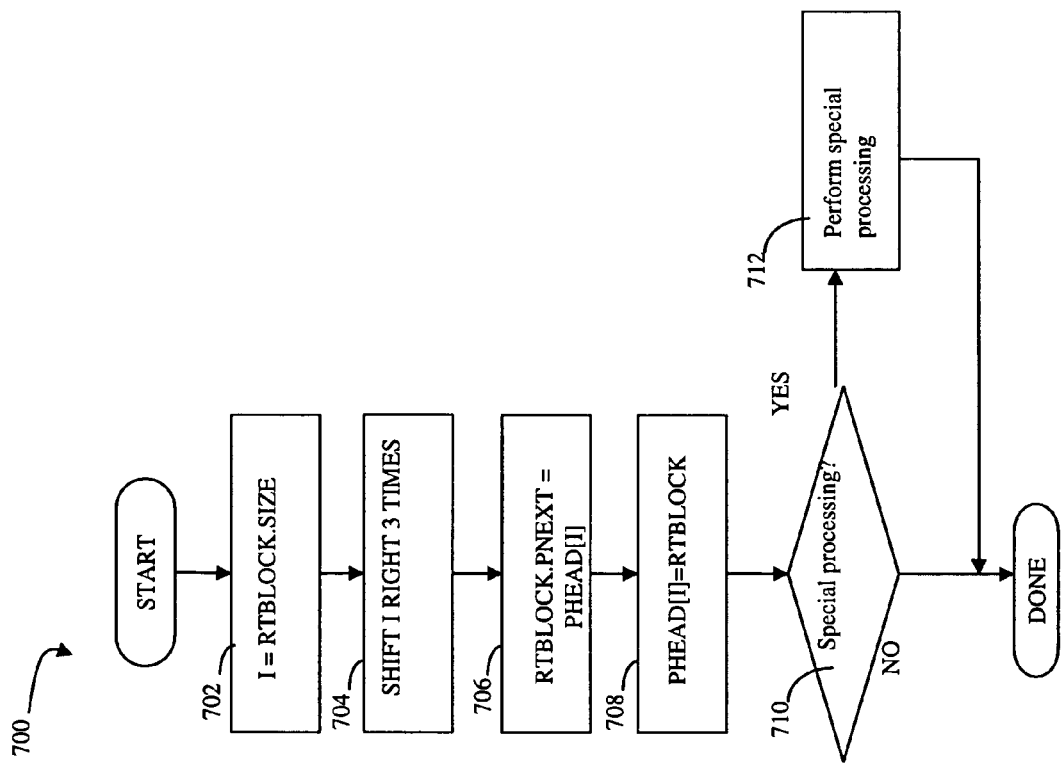
FIG. 17 is a flowchart illustrating steps performed in connection with returning a block of memory to the appropriate bucket according to the system described herein.

Referring now to FIG. 17, shown are processing steps that may be performed in an embodiment in connection with returning a previously allocated portion to the table of unused memory blocks of FIG. 3. It should also be noted that in an embodiment which does not use a table as in FIG. 3, similar processing steps may be performed in connection with returning a previously allocation portion to the heap or other structure of unused memory blocks. In an embodiment using the table of FIG. 3, a block of memory that has been previously allocated may be returned to the appropriate bucket of the data structure as illustrated in FIG. 3. The processing of FIG. 17 includes steps similar to those as described elsewhere herein in connection with FIG. 6 with additional processing at steps 710 and 712. Step 710 makes a determination as to whether special processing is to be performed. In one embodiment using the allocation list, this step includes determining whether a portion or block of memory being returned has a corresponding entry on an allocation list. If so, control proceeds to step 712 to remove the entry from the allocation list prior to continuing processing. Otherwise if step 710 determines that there is no corresponding entry on a saved allocation list, control continues with regular processing.

In another embodiment which does not use the allocation list and makes use of a marker field which is an additional field in the memory block descriptor, step 712 processing includes setting the marker field to some value other than the special marker value indicating that the associated memory portion's contents are to be preserved. In yet another embodiment which does not use the allocation list and which uses the pnext field as the marker field, when returning the memory portion to the list of available memory, processing steps of FIG. 6 may be performed.

It should be noted that an embodiment may return previously allocated memory to a location other than the table as illustrated in FIG. 3. In connection with returning the previously allocated memory to other structures, processing similar to that described in connection with steps 710 and 712 may also be performed.

Figure 18:
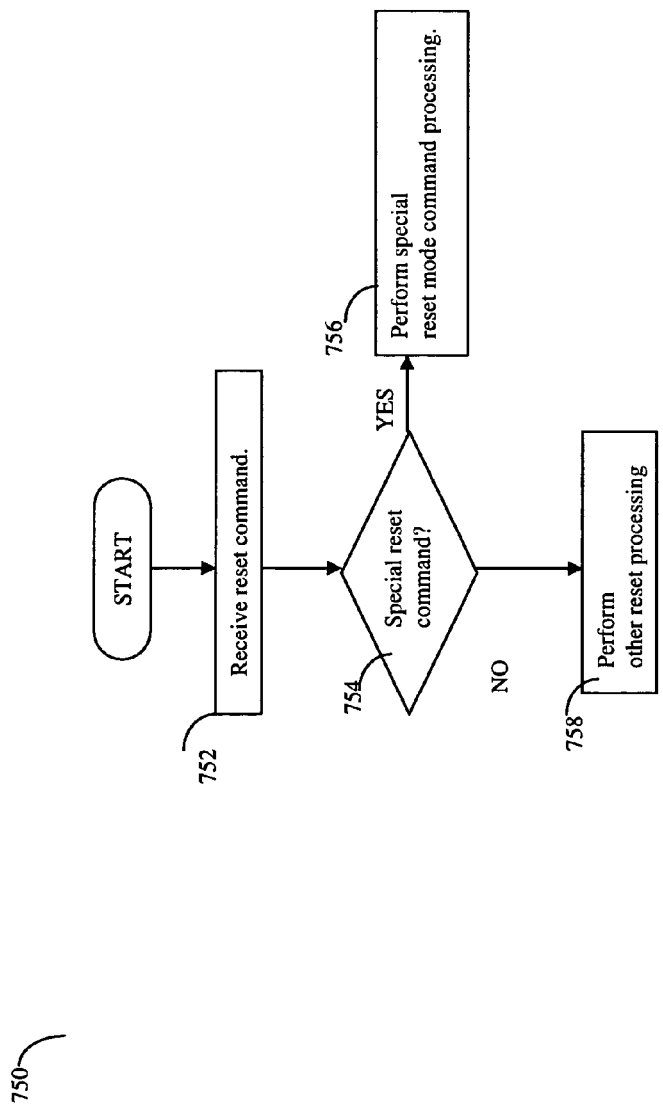
FIG. 18 is a flowchart of processing steps performed in connection with processing a reset command.

Referring now to FIG. 18, shown is a flowchart of processing steps that may be performed in an embodiment in connection with processing a reset command. At step 752, a reset command is received. At step 754, a determination is made as to whether the reset command is a special reset command indicating that special reset mode processing is to be performed. If so, control proceeds to step 756 to perform the special reset mode processing. As will be described in more detail in the following paragraphs, the special reset mode processing may provide for preservation of previously designated portions of allocated memory. Entries denoting the previously designated portions of allocated memory may be stored on one or more allocations lists such as illustrated in FIG. 14 with each list associated with a heap. If step 754 determines that a special reset command was not received, control proceeds to step 758 to perform other reset command processing. It should be noted that processing of step 758 may be characterized as normal or regular reset command processing without making use of the previously-designated allocated portions of memory to be preserved.

Figure 19:
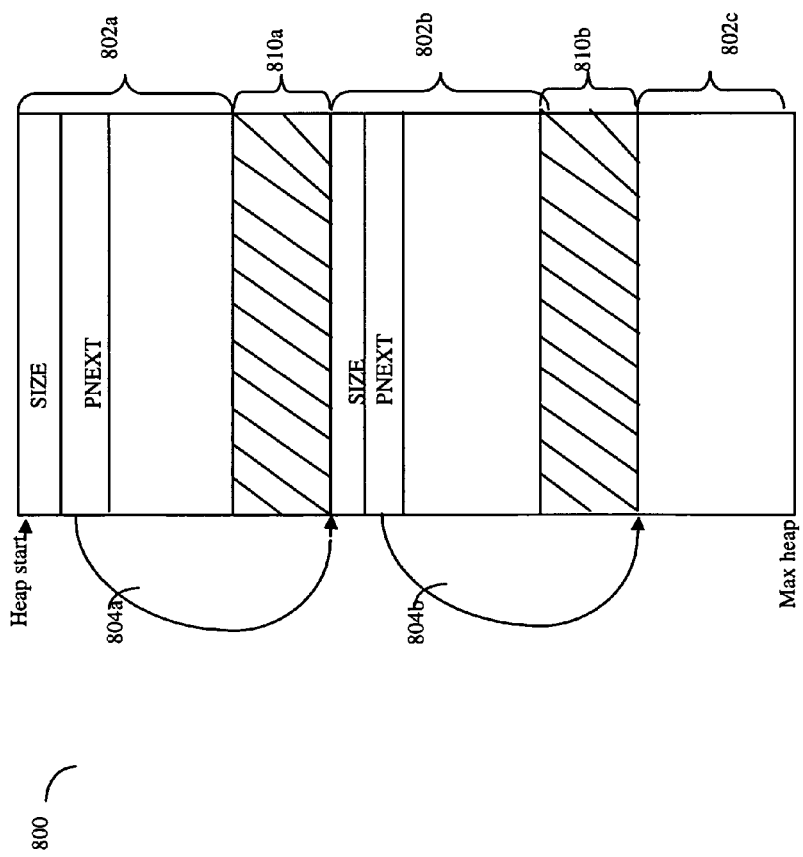
FIG. 19 is an example illustrating a heap after performing initialization processing in connection with a special reset command.

Referring now to FIG. 19, shown is an example of a heap after performing initialization in connection with special reset mode processing. The initialization performed in connection with special reset mode processing is described in more detail in connection with FIG. 20. The allocation list for a heap is traversed prior to using the heap for memory allocations. The processing identifies all previously designated memory allocations which are to be preserved. Those previously designated memory allocations are not included in the pool of free memory used for subsequent allocations.

FIG. 19 illustrates a single heap including designated free portions 802a, 802b, and 802c. Entries in an allocation list associated with the illustrated heap designate that memory portions 810a and 810b are to be preserved. Initialization processing traverses the allocation list and removes the designated memory portions from the heap as illustrated in 800 when a special reset command has been designated. The snapshot as illustrated in FIG. 19 represents those portions of free memory that will be available for allocation subsequent to the special reset mode processing as may be performed, for example, when resetting CPU A with reference to FIG. 13. In the event that portions such as 810a and 810b have been included in the allocation list, resetting CPU A in the special reset mode will not interrupt the processing by CPU B using 810a and 810b of the example 800.

With reference to FIG. 14, an entry in the list 500 may also include an additional field designating a size associated with the allocated memory. This size value included in the list entry may be used as a sanity check when performing special reset mode processing. The size value from the list entry may be compared to the size value actually stored in the heap for the allocated memory portion as designated by the entry offset. In the event that the size as saved in the entry of the list 500 differs from the actual size included in the location at the offset, error processing may be performed. It may be determined that there has been a data corruption in the event that these two sizes unexpectedly differ. Further processing associated with the special reset mode processing may accordingly be aborted. Processing may continue with the regular or normal reset mode processing in the event that any portion of the preserved or allocated list entries has been determined to be corrupted.

Figure 20:
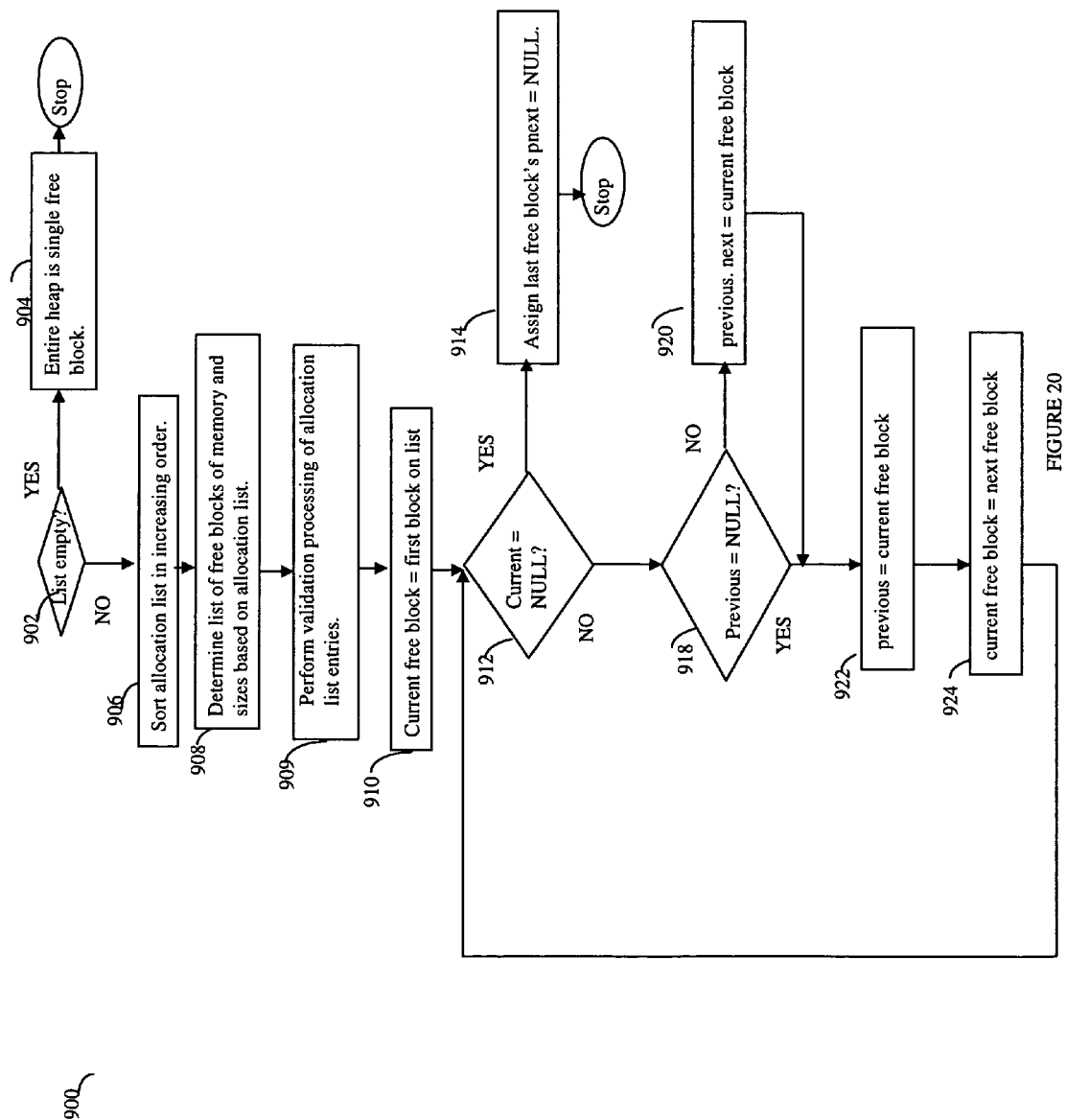
FIG. 20 is a flowchart of processing steps performed as part of memory initialization processing in connection with a special reset command.

Referring now to FIG. 20, shown is a flowchart 900 of processing steps that may be performed in connection with initialization of a heap subsequent to receiving a special reset command. Processing of the steps of 900 may result in the structure as illustrated in 800 of FIG. 19 preserving the contents of previously-designated portions of allocated memory. The processing steps of 900 may be performed for each heap. At step 902, a determination is made as to whether the allocation list for the heap is empty. If so, control proceeds to step 904 to update any structures to indicate that the entire heap is a single free memory block. Otherwise, control proceeds to step 906 to sort the allocation list in increasing order of heap offset or address locations. It should be noted that step 906 may be optionally performed in an embodiment which operates on an unsorted allocation list. Additionally, step 906 processing may also optionally include coalescing contiguous or adjacent entries as may be represented by a single entry in the list. At step 908, a list of free memory blocks and associated sizes for each memory block are determined in accordance with the allocation list. Step 908 processing may traverse the entries on the allocation list and determine a list of free memory blocks and the boundaries of each block of free memory such as, for example, portions 802a, 802b, and 802c of FIG. 19. Step 909 may be optionally performed to validate entries on the allocation list. Validation processing may include, for example, ensuring that all allocated entries and associated sizes are entirely within the bounds of unallocated memory, ensuring that the size that may be optionally included in each allocation list entry matches the size as indicated in the size field of a descriptor associated with the allocation. Subsequent processing steps of flowchart 900 link together blocks of free memory, such as by updating the pnext field of each memory block. At step 910, current free block is assigned to the first free block on the free block list determined from step 908. At step 912, a determination is made as to whether processing is complete for all free blocks. If not, control proceeds to step 918 to determine if the variable previous is null. If not, control proceeds to step 920 to assign previous.next to the current free block. Previous identifies the immediately preceding free block from the list which has been processed. From step 920 control proceeds to step 922. If step 918 evaluates to yes, control proceeds directly to step 922 where the variable previous is assigned the current free block. At step 924, processing continues with the next free block in the free block list determined at step 908. Control proceeds to step 912 until all free blocks have been processed causing step 912 to evaluate to yes. When step 912 evaluates to yes, control proceeds to step 914 where the last free block's pnext field is assigned null since it is the last free block in the linked list of free blocks for the heap.

In an embodiment which does not build the allocation list when performing dynamic memory allocations and rather uses a marker field, processing in connection with the initialization for a special reset command may include performing the steps of FIG. 20 with an additional step 901 which produces a list equivalent to the allocation list. In this embodiment using markers, a list may be constructed at a step 901 by traversing memory looking for the special marker values and constructing corresponding list elements prior to performing any other steps of FIG. 20. The list produced by step 901 may include entries for all allocated portions and associated locations to be preserved in accordance with the marker values detected in the memory traversal. Subsequently, processing may continue with step 902 of FIG. 20.

It will be appreciated by those of ordinary skill in the art that other steps may be performed to process the allocation list and determine the free memory blocks and allocated memory locations as illustrated in FIG. 19.

Figure 21:
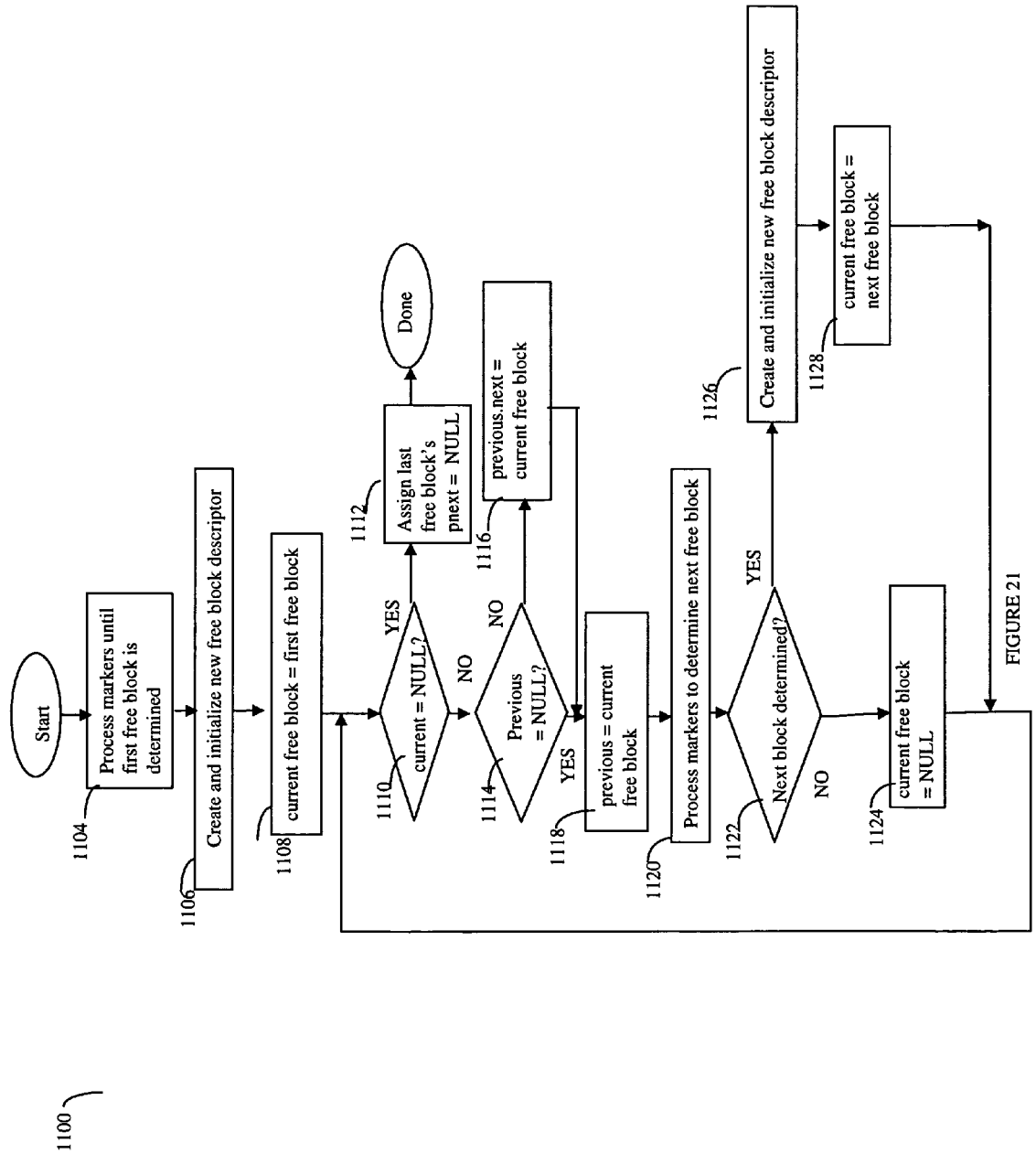
FIG. 21 is a flowchart of processing steps of another embodiment that may be performed as part of memory initialization processing in connection with a special reset command.

Referring now to FIG. 21, shown is a flowchart 1100 of processing steps that may be performed in another embodiment in connection with initialization of a heap subsequent to receiving a special reset command. The processing of flowchart 1100 may be performed in an embodiment which does not build the allocation list in connection with dynamic memory allocations but rather uses marker fields as described herein. Processing of the steps of 1100 may result in the structure as illustrated in 800 of FIG. 19 preserving the contents of previously-designated portions of allocated memory. The processing steps of 1100 may be performed for each heap. At step 1104, markers are processed until the first free block is determined. At step 1106, a new free block descriptor is created and initialized. At step 1108, current free block is assigned to the new free block descriptor created at step 1106. At step 1110, processing determines if the current free block is NULL. If so, control proceeds to step 1112 to assign the last free block's pnext field the value of NULL. Other control proceeds to step 1114 where a determination is made as to whether the variable previous is NULL. If not, control proceeds to step 1116 where previous.next=current free block to connect the current and previous free blocks. Control proceeds to steps 1118. If step 114 evaluates to yes, control proceeds directly to step 1118 where previous is assigned the current free block. At step 1120, markers are processed until the next free block is determined, if any. Step 1122 determines whether a next free block as been determined. If so, control proceeds to step 1126 to create and initialize a new free block descriptor. At step 1128, current free block is assigned the next free block and control proceeds to step 1110. Otherwise, if step 1122 evaluates to no indicating that no next free block is determined, control proceeds to step 1124 where current free block=NULL indicating that there is no next current free block to be processed. Control then proceeds to step 1110.

In connection with the foregoing processing of flowchart 1100, each heap of memory may be traversed searching for markers. For example, one embodiment may search the memory address range associated with a heap in increments of the size of each marker field to determine boundaries of each free block memory.

It should be noted that although the foregoing describes processing for maintaining and preserving designated portions of allocated memory in connection with a later received special reset command, maintaining designated portions of allocated memory may be performed in connection with other commands than as described herein.

Figure 22:
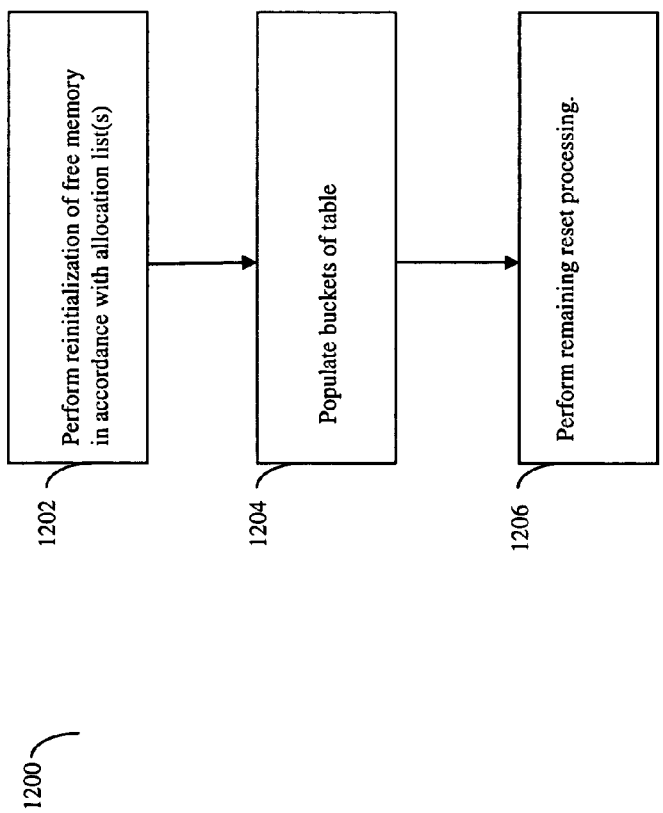
FIG. 22 is a flowchart of processing steps performed in connection with a special reset command.

Referring now to FIG. 22, shown is a flowchart of processing steps that may be performed in an embodiment for special reset mode command processing. The steps of flowchart 1200 describe in more detail the processing step 756 from FIG. 18 in an embodiment which uses the table of FIG. 3. At step 1202, reinitialization of free memory is performed. As part of step 1202 processing, an embodiment may perform, for example, the steps of flowchart 900 of FIG. 20 using the allocation list or an equivalent list produced using an additional step 901, or flowchart 1100 of FIG. 21 in an embodiment that uses markers without such a list. At step 1204, the buckets of the table of unused memory as described in FIG. 3, for example, may be populated. At step 1206, any remaining reset processing may be performed.

An embodiment may invoke a function for each entry on the allocation list in order to remove the allocated storage from the heap or free memory portion during reinitialization processing as described herein associated with a special mode reset. An embodiment may use a function with a programming interface as follows:

void*sk_sheap_realloc (void*bp,
        unsigned int num_bytes,
        unsigned int sheap_id)
    in which:
    bp as an input parameter representing the address in memory to be removed from free memory;
    num_bytes is an input parameter representing the number of bytes of the allocated area being removed from the free memory; and
    sheap_id is input parameter which is an identifier identifying a particular heap.

The last parameter, sheap_id, may be an optional input parameter in an embodiment having more than one heap for memory allocations. The above-referenced function may also perform standard memory allocations known to those of ordinary skill in the art depending on the particular values of input parameters. In connection with performing standard memory allocation functionality, if bp identifies a location in free memory, an error is returned. However, in connection with processing described herein, when the bp input parameter identifies a location in free memory, the processing for removing a specified location from the free memory is performed thereby making it an allocated portion of memory. The above-referenced function may also perform sanity or validation processing as described herein. For example, if bp identifies a location in free memory indicating that processing is performed in connection with removing a memory portion from free memory blocks, the function may perform processing to ensure that the entire specified portion is included in free memory.

It should be noted that the foregoing processing may be generally useful in instances where it is desirable to perform a "soft" reset on a processor while maintaining the contents and locations of portions of dynamically allocated memory.

While the invention has been disclosed in connection with various embodiments, modifications thereon will be readily apparent to those skilled in the art. Accordingly, the spirit and scope of the invention is set forth in the following claims.

What is claimed is:

1. A method of managing memory, comprising:
receiving a request for a memory allocation;
determining whether the memory allocation is to be maintained when subsequently initializing memory; and
saving information about the memory allocation to maintain the memory allocation during subsequently initializing memory that is done in response to a special reset command, wherein the memory is shared by a plurality of processing units including a first processing unit and a second processing unit, and wherein resetting the first processing unit causing initialization of the memory in response to the special reset command does not interrupt processing by the second processing unit that uses at least a portion of the memory, and wherein the information about the memory allocation is not made use of during subsequently initializing the memory that is done in response to a normal reset command that is different from the special reset command.

2. The method of claim 1, wherein initializing is performed as part of special reset mode processing.

3. The method of claim 2, wherein special reset mode processing is performed in response to receiving the special reset command.

4. The method of claim 3, wherein the special reset command is issued to reset the first processing unit causing reset of the memory and wherein the second processing unit uses a first allocated memory portion that is maintained when initializing the memory as part of processing for the special reset command.

5. The method of claim 1, wherein saving includes adding an entry to an allocation list associated with the memory, the entry including a location associated with the memory allocation.

6. The method of claim 5, further comprising:
returning the memory allocation to a portion of available memory designated as available for use in subsequent allocations; and
removing an entry from the allocation list in response to returning if the memory allocation has a corresponding entry on the allocation list.

7. The method of claim 6, wherein the memory allocation is returned to a table of unused memory blocks organized in accordance with a size associated with each of the unused memory blocks, the memory allocation being returned to a location in the table in accordance with a size of the memory allocation.

8. The method of claim 1, wherein allocating memory includes setting a marker value in a field associated with the memory allocation indicating that the memory allocation is to be maintained during a subsequent initialization.

9. The method of claim 8, further comprising:
setting the field to a non-marker value; and
returning the memory allocation to a portion of available memory designated as available for use in subsequent allocations.

10. The method of claim 8, further comprising:
returning the memory allocation to a portion of available memory designated as available for use in subsequent allocations, wherein the field is used to connect a block of memory corresponding to the memory allocation to another portion of available memory.

11. A method of managing memory, comprising:
in response to a special reset command, performing a special subsequent initialization of a memory;
while performing the special subsequent initialization, determining special portions of memory previously marked to be maintained during the special subsequent initialization;
allocating the special portions after initiating the special subsequent initialization and prior to receiving any requests for memory; and
following allocating the special portions, allowing allocation of additional portions in response to a request for memory, wherein the additional portions do not overlap with the special portions, wherein the memory is shared by a plurality of processing units including a first processing unit and a second processing unit, and wherein resetting the first processing unit causing initialization of the memory during the special subsequent initialization does not interrupt processing by the second processing unit that uses at least a portion of the memory; and
in response to a normal reset command, performing a normal subsequent initialization of the memory, wherein the normal subsequent initialization does not make use of the allocation of the special portions.

12. The method of claim 11, wherein the special portions are created in response to requests for memory prior to performing the special initialization.

13. Computer executable code, embodied in a computer readable medium, that manages memory, comprising:
executable code that receives a request for a memory allocation;
executable code that determines whether the memory allocation is to be maintained when subsequently initializing memory; and
executable code that saves information about the memory allocation to maintain the memory allocation during subsequently initializing memory that is done is response to a special reset command, wherein the memory is shared by a plurality of processing units including a first processing unit and a second processing unit, and wherein resetting the first processing unit causing initialization of the memory in response to the special reset command does not interrupt processing by the second processing unit that uses at least a portion of the memory, and wherein the information about the memory allocation is not made use of during subsequently initializing the memory that is done in response to a normal reset command that is different from the special reset command.

14. Computer executable code of claim 13, wherein initializing is performed as part of special reset mode processing.

15. Computer executable code of claim 14, wherein special reset mode processing is performed in response to receiving the special reset command.

16. Computer executable code of claim 13, wherein executable code that saves includes executable code that adds an entry to an allocation list associated with the memory, the entry including a location associated with the memory allocation.

17. Computer executable code of claim 16, further comprising:
   executable code that returns the memory allocation to a portion of available memory designated as available for use in subsequent allocations; and
   executable code that removes an entry from the allocation list in response to returning, if the memory allocation has a corresponding entry on the allocation list.

18. Computer executable code of claim 13, wherein executable code that allocates memory includes executable code that sets a marker value in a field associated with the memory allocation indicating that the memory allocation is to be maintained during a subsequent initialization.

19. Computer executable code of claim 18, further comprising:
   executable code that sets the field to a non-marker value; and
   executable code that returns the memory allocation to a portion of available memory designated as available for use in subsequent allocations.

20. Computer executable code of claim 19, further comprising:
   executable code that returns the memory allocation to a portion of available memory designated as available for use in subsequent allocations, wherein the field is used to connect a block of memory corresponding to the memory allocation to another portion of available memory.

* * * * *